United States Patent
Uliel et al.

(10) Patent No.: US 9,442,731 B2
(45) Date of Patent: Sep. 13, 2016

(54) PACKED TWO SOURCE INTER-ELEMENT SHIFT MERGE PROCESSORS, METHODS, SYSTEMS, AND INSTRUCTIONS

(71) Applicant: Intel Corporation, Santa Clara, CA (US)

(72) Inventors: Tal Uliel, Tel Aviv (IL); Elmoustapha Ould-Ahmed-Vall, Chandler, AZ (US); Robert Valentine, Kiryat Tivon (IL); Mark J. Charney, Lexington, MA (US); Thomas Willhalm, Sandhausen (DE)

(73) Assignee: Intel Corporation, Santa Clara, CA (US)

( * ) Notice: Subject to any disclaimer, the term of this patent is extended or adjusted under 35 U.S.C. 154(b) by 364 days.

(21) Appl. No.: 14/142,738

(22) Filed: Mar. 13, 2014

(65) Prior Publication Data
US 2015/0261534 A1   Sep. 17, 2015

(51) Int. Cl.
*G06F 9/30* (2006.01)

(52) U.S. Cl.
CPC ....... *G06F 9/30145* (2013.01); *G06F 9/30032* (2013.01); *G06F 9/30036* (2013.01)

(58) Field of Classification Search
None
See application file for complete search history.

(56) References Cited

U.S. PATENT DOCUMENTS

| | | | | |
|---|---|---|---|---|
| 5,353,403 A | * | 10/1994 | Kohiyama | G09G 5/14 345/534 |
| 5,818,739 A | * | 10/1998 | Peleg | G06F 7/76 708/209 |
| 2003/0131030 A1 | * | 7/2003 | Sebot | G06F 9/3013 708/209 |
| 2004/0098556 A1 | * | 5/2004 | Buxton | G06F 9/3001 711/201 |
| 2005/0108312 A1 | * | 5/2005 | Chen | G06F 9/3001 708/513 |
| 2012/0233443 A1 | * | 9/2012 | Sebot | G06F 9/3001 712/208 |

* cited by examiner

*Primary Examiner* — Corey S Faherty
(74) *Attorney, Agent, or Firm* — Vecchia Patent Agent, LLC

(57) ABSTRACT

A processor includes a decoder to receive an instruction that indicates first and second source packed data operands and at least one shift count. An execution unit is operable, in response to the instruction, to store a result packed data operand. Each result data element includes a first least significant bit (LSB) portion of a first data element of a corresponding pair of data elements in a most significant bit (MSB) portion, and a second MSB portion of a second data element of the corresponding pair in a LSB portion. One of the first LSB portion of the first data element and the second MSB portion of the second data element has a corresponding shift count number of bits. The other has a number of bits equal to a size of a data element of the first source packed data minus the corresponding shift count.

25 Claims, 22 Drawing Sheets

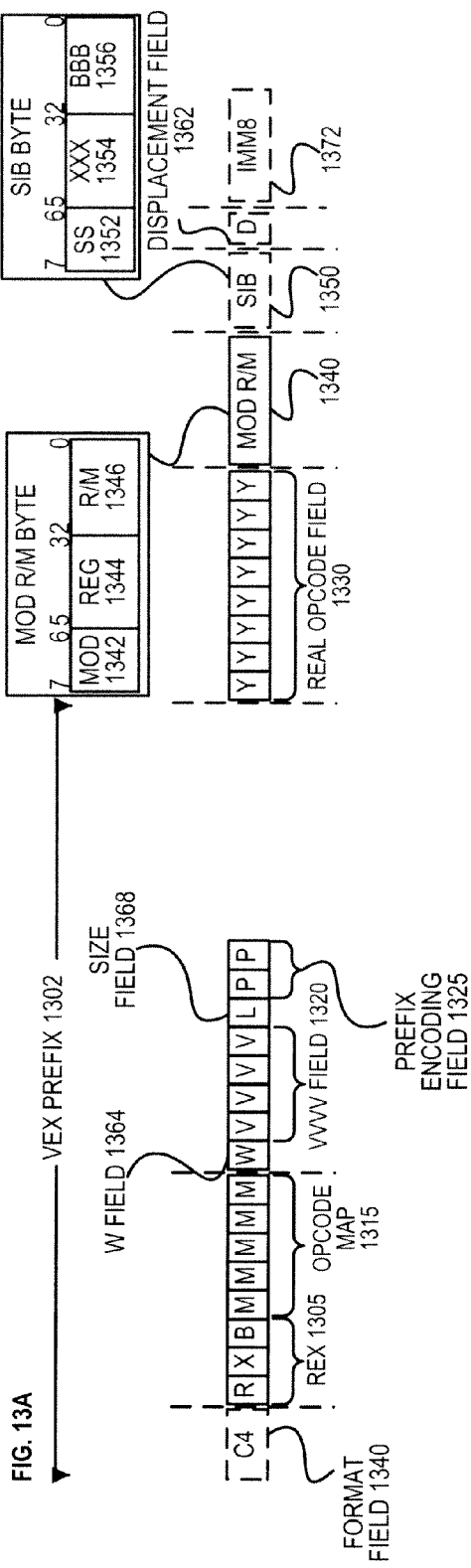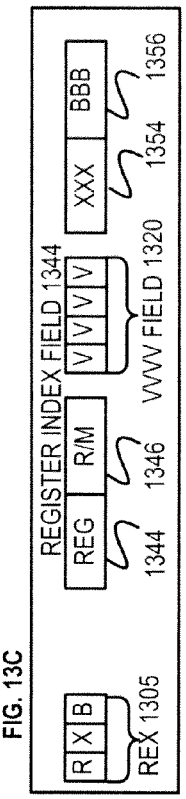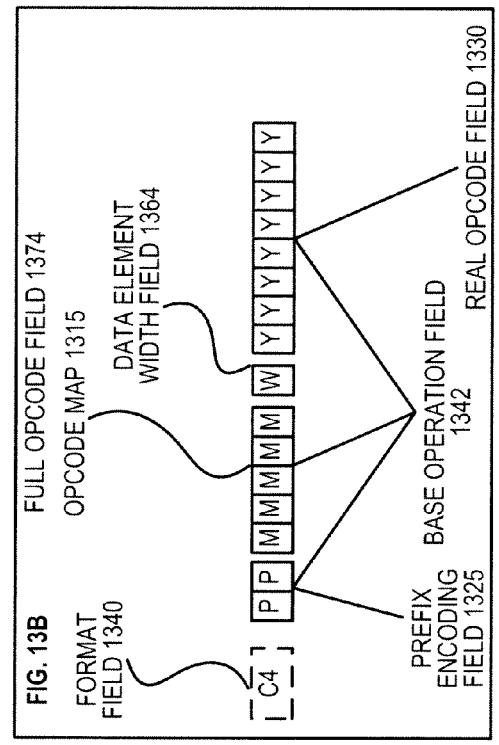
FIG. 13A
FIG. 13B
FIG. 13C

FIG. 14
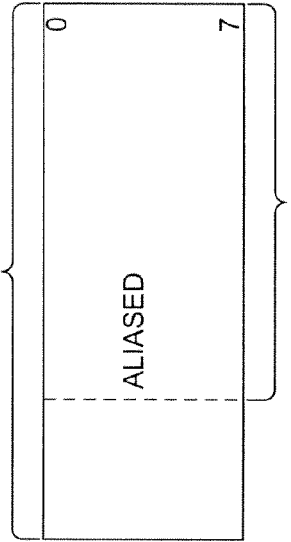
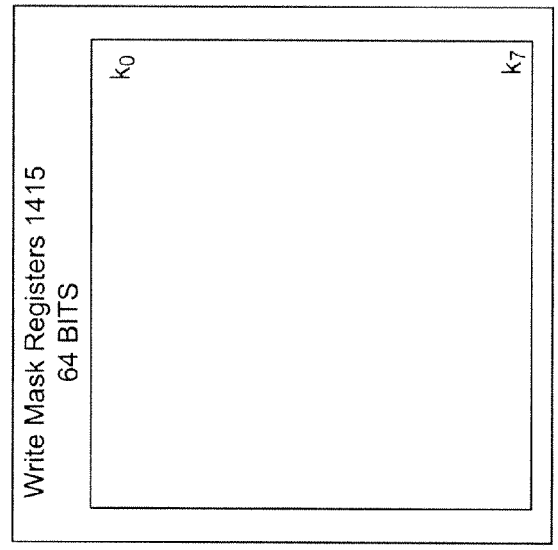
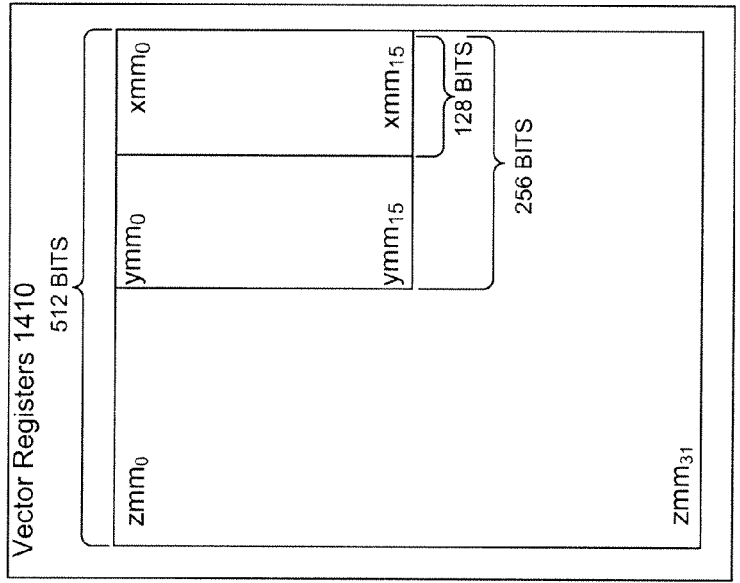

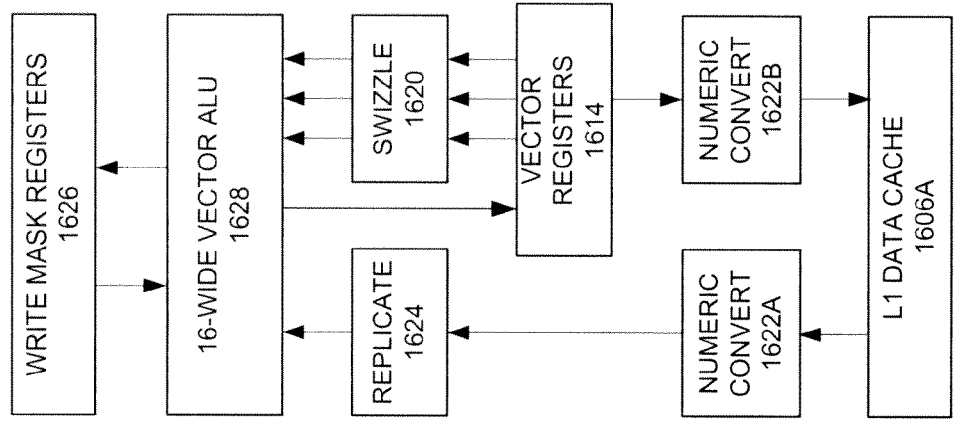
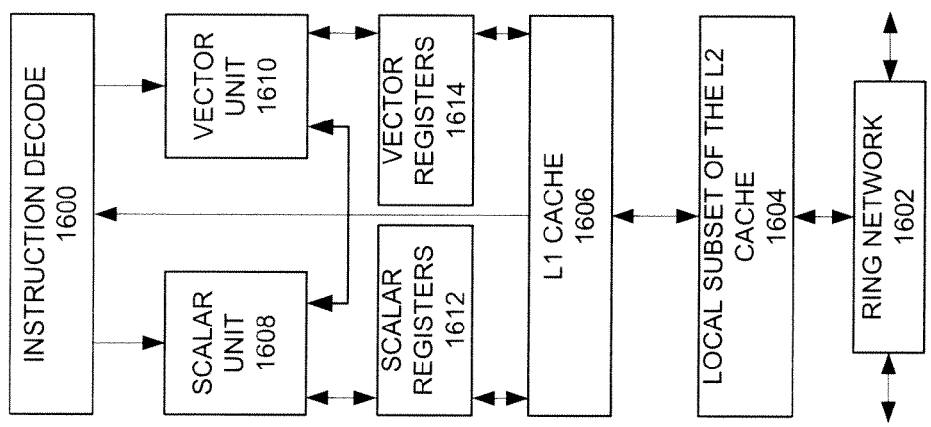

PACKED TWO SOURCE INTER-ELEMENT SHIFT MERGE PROCESSORS, METHODS, SYSTEMS, AND INSTRUCTIONS

BACKGROUND

1. Technical Field

Embodiments described herein generally relate to processors. In particular, embodiments described herein generally relate to processors to operate on packed data operands responsive to instructions.

2. Background Information

Many processors have Single Instruction, Multiple Data (SIMD) architectures. In SIMD architectures, a packed data instruction, vector instruction, or SIMD instruction may operate on multiple data elements simultaneously or in parallel. The processor may have parallel execution hardware responsive to the packed data instruction to perform the multiple operations simultaneously or in parallel.

Multiple data elements may be packed within a register or memory location as packed data or vector data. For example, the bits of a register may be logically divided into a sequence of data elements. Representatively, a 256-bit packed data register may have four 64-bit data elements, eight 32-bit data elements, or sixteen 16-bit data elements. Each data element may represent a separate individual piece of data (e.g., a pixel value), which may be operated upon separately and/or independently of the others.

One type of packed data instruction is a packed shift instruction, which may cause the bits of each data element of a single source packed data to be shifted separately and/or independently of the others. Packed shift left, packed shift right logical, and packed shift right arithmetic instructions are known in the arts. For each bit shifted out of one end, the packed shift left and packed shift right logical instructions may cause a corresponding zero to be inserted at the other end. The packed shift right arithmetic instruction may cause a sign bit to be inserted for each bit shifted out the other end.

BRIEF DESCRIPTION OF THE DRAWINGS

The invention may best be understood by referring to the following description and accompanying drawings that are used to illustrate embodiments. In the drawings:

FIG. 13A illustrates an exemplary AVX instruction format including a VEX prefix, real opcode field, Mod R/M byte, SIB byte, displacement field, and IMM8.

FIG. 13B illustrates which fields from FIG. 13A make up a full opcode field and a base operation field.

FIG. 13C illustrates which fields from FIG. 13A make up a register index field.

FIG. 14 is a block diagram of a register architecture according to one embodiment of the invention.

FIG. 16A is a block diagram of a single processor core, along with its connection to the on-die interconnect network and with its local subset of the Level 2 (L2) cache, according to embodiments of the invention. FIG. 16B is an expanded view of part of the processor core in FIG. 16A according to embodiments of the invention.

DETAILED DESCRIPTION OF EMBODIMENTS

Disclosed herein are packed two source inter-element shift merge instructions, processors to execute the instructions, methods performed by the processors when processing or executing the instructions, and systems incorporating one or more processors to process or execute the instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
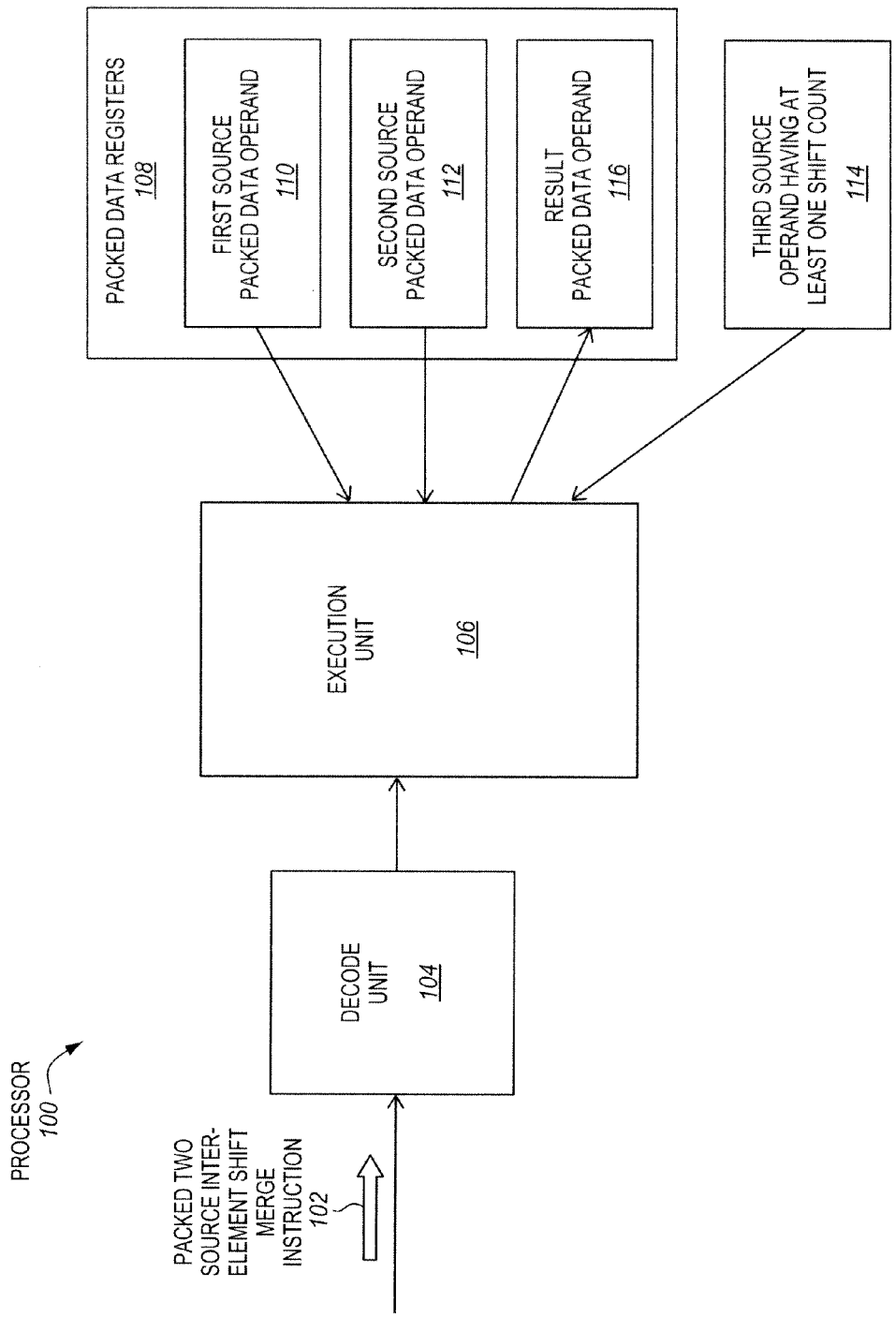
FIG. 1 is a block diagram of an embodiment of a processor that is operable to perform an embodiment of a packed two source inter-element shift merge instruction.

FIG. 1 is a block diagram of an embodiment of a processor 100 that is operable to perform an embodiment of a packed two source inter-element shift merge instruction 102. In some embodiments, the processor may be a general-purpose processor (e.g., of the type commonly used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples. The processor may be any of various complex instruction set computing (CISC) processors, various reduced instruction set computing (RISC) processors, various very long instruction word (VLIW) processors, various hybrids thereof, or other types of processors.

During operation, the processor 100 may receive the embodiment of the packed two source inter-element shift merge instruction 102. For example, the instruction may be received from an instruction fetch unit, an instruction queue, or the like. The instruction may represent a macroinstruction, assembly language instruction, machine code instruction, or other instruction or control signal of an instruction set of the processor. In some embodiments, the instruction may explicitly specify (e.g., through one or more fields or a set of bits), or otherwise indicate (e.g., implicitly indicate, be mapped to that register through an emulation register mapping, etc.), a first source packed data operand 110 having a plurality of data elements, and may specify or otherwise indicate a second source packed data operand 112 having a plurality of data elements. Each data element in the first source packed data operand may correspond to a different data element in the second source packed data operand in a corresponding relative position to provide a plurality of pairs of corresponding data elements. The instruction may also specify or otherwise indicate a third source operand 114 having at least one shift count or in some cases a plurality of shift counts, and may specify or otherwise indicate a destination or destination storage location where a result packed data operand 116 is to be stored.

Referring again to FIG. 1, the processor includes a decode unit or decoder 104. The decode unit may be operable to receive and decode the packed two source inter-element shift merge instruction. The decode unit may output one or more microinstructions, micro-operations, micro-code entry points, decoded instructions or control signals, or other relatively lower-level instructions or control signals that reflect, represent, and/or are derived from the packed two source inter-element shift merge instruction. The one or more relatively lower-level instructions or control signals may implement the relatively higher-level instruction through one or more relatively lower-level (e.g., circuit-level or hardware-level) operations. In some embodiments, the decode unit may include one or more input structures (e.g., input port(s), input interconnect(s), an input interface, etc.) to receive the instruction, an instruction recognition logic coupled with the input structures to receive and recognize the instruction, a decode logic coupled with the recognition logic to receive and decode the instruction into the one or more corresponding lower-level instructions or control signals, and one or more output structures (e.g., output port(s), output interconnect(s), an output interface, etc.) coupled with the decode logic to output the one or more corresponding lower level instructions or control signals. The recognition logic and the decode logic may be implemented using various different mechanisms including, but not limited to, microcode read only memories (ROMs), look-up tables, hardware implementations, programmable logic arrays (PLAs), and other mechanisms used to implement decode units known in the art.

In some embodiments, instead of the packed two source inter-element shift merge instruction being provided directly to the decode unit, an instruction emulator, translator, morpher, interpreter, or other instruction conversion module may optionally be used. Various different types of instruction conversion modules are known in the arts and may be implemented in software, hardware, firmware, or a combination thereof. In some embodiments, the instruction conversion module may be located outside the instruction processing processor, such as, for example, on a separate die and/or in a memory (e.g., as a static, dynamic, or runtime instruction emulation module). By way of example, the instruction conversion module may receive the packed two source inter-element shift merge instruction which may be of a first instruction set and may emulate, translate, morph, interpret, or otherwise convert the packed two source inter-element shift merge instruction into one or more corresponding or derived intermediate instructions or control signals which may be of a second different instruction set. The one or more intermediate instructions or control signals of the second instruction set may be provided to a decode unit that is operable to decode instructions or control signals of the second instruction set. The decode unit may decode the received one or more instructions or control signals of the second instruction set into one or more lower-level instructions or control signals executable by native hardware of the processor (e.g., one or more execution units).

The processor 100 also includes a set of packed data registers 108. Each of the packed data registers may represent an on-die storage location that is operable to store packed data, vector data, or SIMD data. The packed data registers may represent architecturally-visible registers (e.g., an architectural register file). The architecturally-visible or architectural registers are visible to software and/or a programmer and/or are the registers indicated by instructions of an instruction set of the processor to identify operands. These architectural registers are contrasted to other non-architectural or non-architecturally visible registers in a given microarchitecture (e.g., temporary registers, reorder buffers, retirement registers, etc.). The packed data registers may be implemented in different ways in different microarchitectures using well-known techniques and are not limited to any particular type of circuit. Various different types of registers are suitable. Examples of suitable types of registers include, but are not limited to, dedicated physical registers, dynamically allocated physical registers using register renaming, and combinations thereof.

In some embodiments, the first source packed data operand 110 may optionally be stored in a first packed data register, and the second source packed data operand 112 may be stored in a second packed data register. Alternatively, memory locations, or other storage locations, may be used for one or more of these operands. In some embodiments, the third source operand 114 having the at least one shift count may optionally be stored in a third packed data register. Alternatively, the third source operand having the at least one shift count may include an immediate of the instruction, may be stored in a general-purpose register, or may be stored in another storage location. In some embodiments, the destination storage location may also be a packed data register. In some cases, the packed data register used as the destination storage location may be different than the packed data registers used for the first and second source packed data operands. In other cases, the packed data register used for one of the source packed data operands may be reused as the destination storage location (e.g., the result packed data operand may be written over one of the source packed data operands). Alternatively, memory or other storage locations may optionally be used for the destination storage location.

Referring again to FIG. 1, the execution unit 106 is coupled with the decode unit 104 and the packed data registers 108. By way of example, the execution unit may include a logic unit, an arithmetic logic unit, another type of digital circuit operable to perform logical operations, or the like. The execution unit may receive the one or more decoded or otherwise converted instructions or control signals that represent and/or are derived from the packed two source inter-element shift merge instruction 102. The execution unit may also receive the first source packed data operand 110, the second source packed data operand 112, and the at least one shift count provided by the third source operand 114, which are indicated by the instruction. The execution unit is operable in response to and/or as a result of the packed two source inter-element shift merge instruction (e.g., in response to one or more instructions or control signals decoded directly or indirectly (e.g., through emulation) from the instruction) to store the result packed data operand 116 in the destination storage location indicated by the instruction. The result packed data operand may include a plurality of result data elements. Each result data element may correspond to a different pair of the corresponding data elements from the first and second source packed data operands in a corresponding relative position within the operands.

In some embodiments, each result data element of the result packed data operand 116 may include a first least significant bit (LSB) portion of a first data element of the corresponding pair of corresponding data elements from the first and second source packed data operands in a most significant bit (MSB) portion of the result data element. In some embodiments, each result data element may also include a second MSB portion of a second different data element of the corresponding pair of corresponding data elements from the first and second source packed data operands in a LSB portion of the result data element. In some embodiments, one of the first LSB portion of the first data element, and the second MSB portion of the second data element, may have a number of bits equal to a corresponding shift count. In some embodiments, the other of the first LSB portion of the first data element, and the second MSB portion of the second data element, may have a number of bits equal to a size of a corresponding data element of the first source packed data operand minus the corresponding shift count. In some embodiments the same single scalar shift count may correspond to each pair of corresponding data elements. In other embodiments, a different shift count, for example provided by a third source packed data operand having multiple shift counts, may correspond to each different pair of corresponding data elements. In some embodiments, the result packed data operand may be any of those shown and described for any of FIGS. 3-8, although the scope of the invention is not so limited.

The execution unit and/or the processor may include specific or particular logic (e.g., transistors, integrated circuitry, or other hardware potentially combined with firmware (e.g., instructions stored in non-volatile memory) and/or software) that is operable to perform the packed two source inter-element shift merge instruction and/or store the result packed data operand in response to and/or as a result of the packed two source inter-element shift merge instruction (e.g., in response to one or more instructions or control signals decoded or otherwise derived from the packed two source inter-element shift merge instruction). In some embodiments, the execution unit may include one or more input structures (e.g., input port(s), input interconnect(s), an input interface, etc.) to receive source operands, circuitry or logic coupled with the input structure(s) to receive and process the source operands and generate the result operand, and one or more output structures (e.g., output port(s), output interconnect(s), an output interface, etc.) coupled with the circuitry or logic to output the result packed data operand. In some embodiments, the execution unit may include the circuitry or logic shown and described for any one or more of FIGS. 4-5 or FIGS. 7-8, which are illustrative examples of suitable micro-architectural arrangements, although the scope of the invention is not so limited.

To avoid obscuring the description, a relatively simple processor 100 has been shown and described. In other embodiments, the processor may optionally include other well-known processor components. Possible examples of such components include, but are not limited to, an instruction fetch unit, instruction and data caches, second or higher level caches, out-of-order execution logic, an instruction scheduling unit, a register renaming unit, a retirement unit, a bus interface unit, instruction and data translation lookaside buffers, prefetch buffers, microinstruction queues, microinstruction sequencers, other components included in processors, and various combinations thereof. Numerous different combinations and configurations of such components are suitable. Embodiments are not limited to any known combination or configuration. Moreover, embodiments may be included in processors have multiple cores, logical processors, or execution engines at least one of which has a decode unit and an execution unit to perform an embodiment of a packed two source inter-element shift merge instruction.

Figure 2:
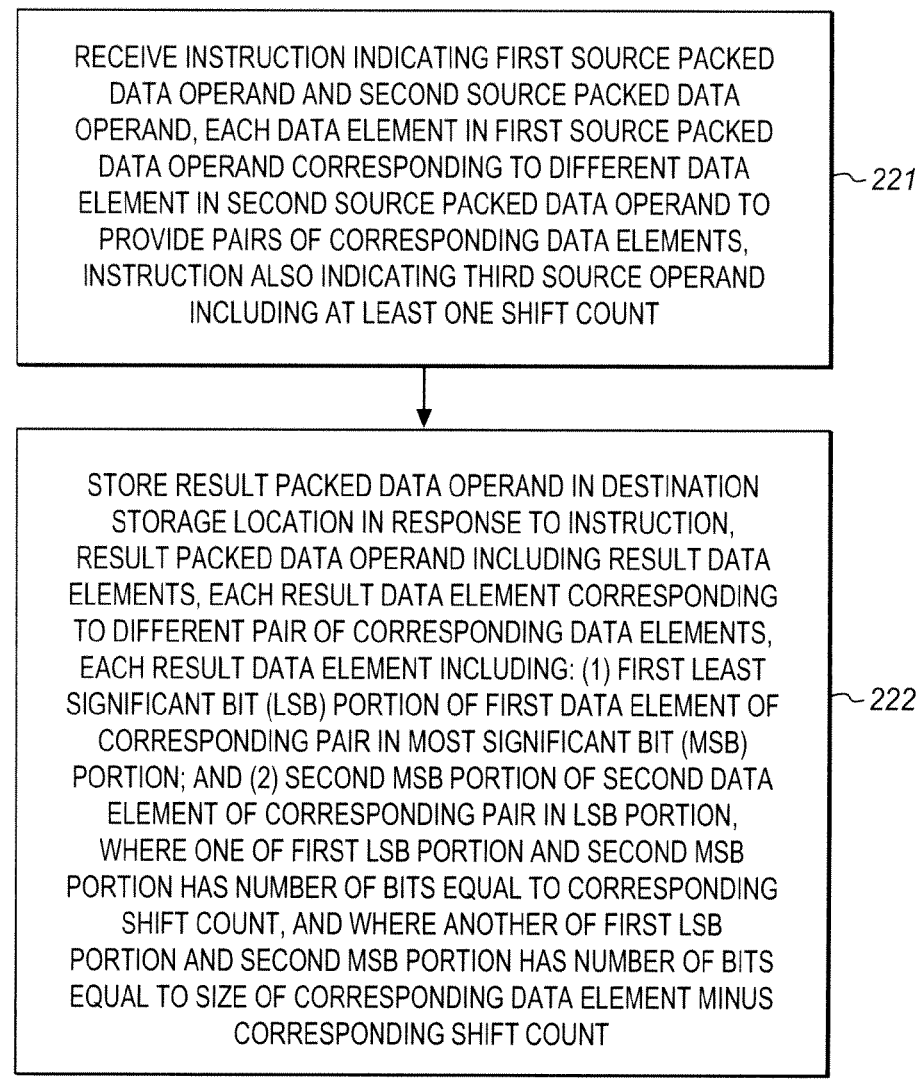
FIG. 2 is a block flow diagram of an embodiment of a method of performing an embodiment of a packed two source inter-element shift merge instruction.

FIG. 2 is a block flow diagram of an embodiment of a method 220 of performing an embodiment of a packed two source inter-element shift merge instruction. In various embodiments, the method may be performed by a processor, instruction processing apparatus, or other digital logic device. In some embodiments, the operations and/or method of FIG. 2 may be performed by and/or within the processor of FIG. 1. The components, features, and specific optional details described herein for the processor of FIG. 1 also optionally apply to the operations and/or method of FIG. 2. Alternatively, the operations and/or method of FIG. 2 may be performed by and/or within a similar or different processor or apparatus. Moreover, the processor of FIG. 1 may perform operations and/or methods the same as, similar to, or different than those of FIG. 2.

The method includes receiving the packed two source inter-element shift merge instruction, at block 221. In various aspects, the instruction may be received at a processor, an instruction processing apparatus, or a portion thereof (e.g., an instruction fetch unit, a decode unit, a bus interface unit, etc.). In various aspects, the instruction may be received from an off-die source (e.g., from memory, interconnect, etc.), or from an on-die source (e.g., from an instruction cache, instruction queue, etc.). In some embodiments, the instruction may specify or otherwise indicate a first source packed data operand including a plurality of data elements, and may specify or otherwise indicate a second source packed data operand including a plurality of data elements. Each data element in the first source packed data operand may correspond to a different data element in the second source packed data operand in a corresponding relative position within the operands to provide a plurality of pairs of corresponding data elements. The instruction may also specify or otherwise indicate a third source operand including at least one shift count or in some cases a plurality of shift counts.

A result packed data operand is stored in a destination storage location indicated by the packed two source inter-element shift merge instruction in response to and/or as a result of the packed two source inter-element shift merge instruction, at block 222. Representatively, an execution unit, instruction processing apparatus, or processor may perform the instruction and store the result packed data operand. The result packed data operand may include a plurality of result data elements. Each result data element may correspond to a different pair of corresponding data elements in a corresponding relative position.

In some embodiments, each result data element may include a first least significant bit (LSB) portion of a first data element of the corresponding pair of corresponding data elements from the first and second source packed data operands in a most significant bit (MSB) portion of the result data element. In some embodiments, each result data element may also include a second MSB portion of a second data element of the corresponding pair of corresponding data elements from the first and second source packed data operands in a LSB portion of the result data element. In some embodiments, one of the first LSB portion of the first data element, and the second MSB portion of the second data element, may have a number of bits equal to a corresponding shift count. In some embodiments, another of the first LSB portion of the first data element, and the second MSB portion of the second data element, may have a number of bits equal to a size of a corresponding data element of the first source packed data operand minus the corresponding shift count. In some embodiments the same single scalar shift count may correspond to each pair of corresponding data elements. In other embodiments, a different shift count, for example provided by a third source packed data operand having multiple shift counts, may correspond to each different pair of corresponding data elements.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, an execution unit may perform microarchitectural operations to implement the instruction, results may be rearranged back into program order, etc. In some embodiments, the microarchitectural operations to implement the instruction may optionally include any of the operations described for FIGS. 4-5 or FIGS. 7-8.

Figure 3:
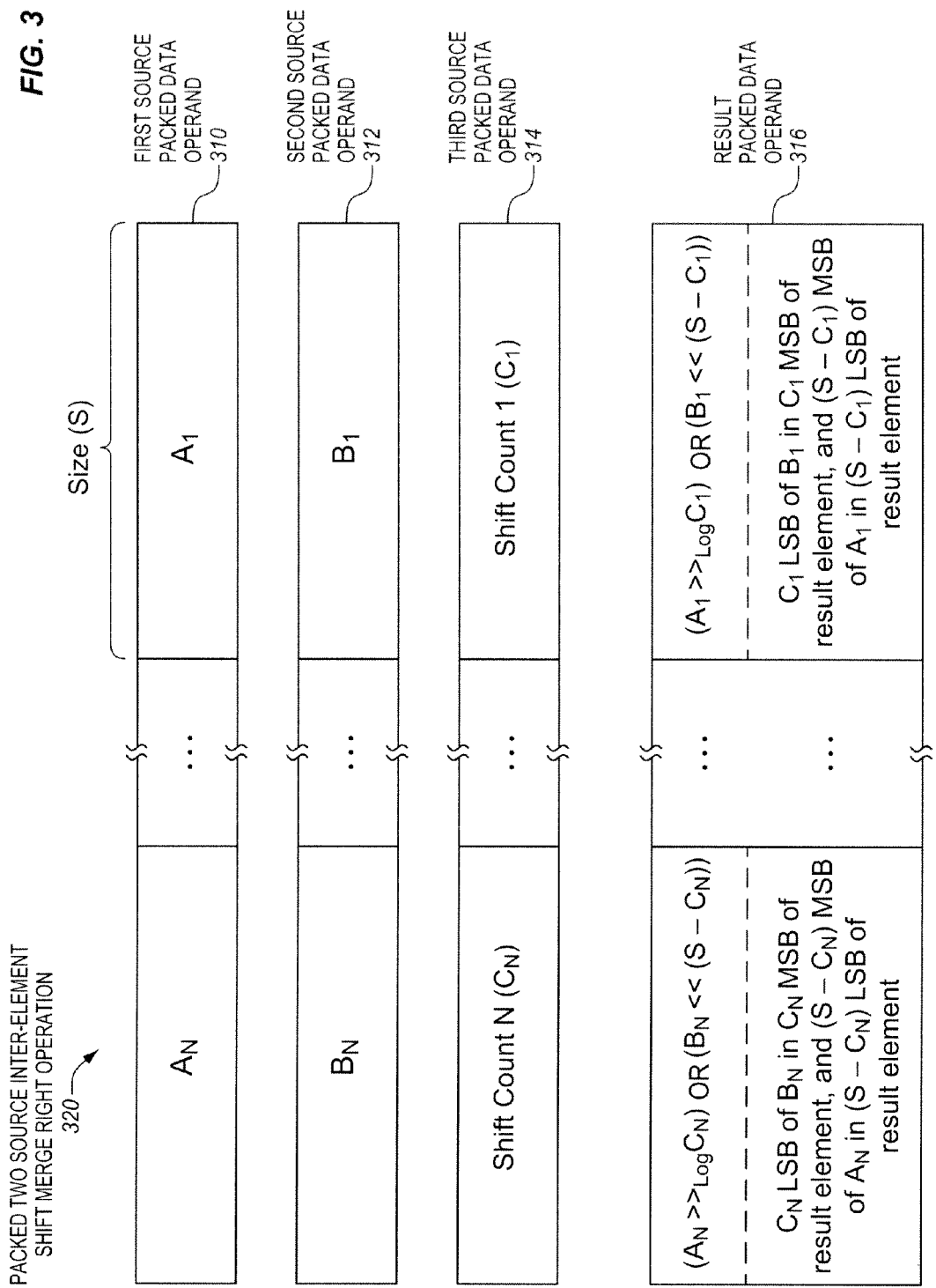
FIG. 3 is a block diagram illustrating an embodiment of a packed two source inter-element shift merge right operation.

FIG. 3 is a block diagram illustrating an embodiment of a packed two source inter-element shift merge right operation 320 that may be performed in response to an embodiment of a packed two source inter-element shift merge right instruction. The instruction may specify or otherwise indicate a first source packed data operand 310 having a first plurality of data elements $A_1$-$A_N$. The instruction may specify or otherwise indicate a second source packed data operand 312 having a second plurality of data elements $B_1$-$B_N$. Each data element in the first source packed data operand may correspond to a different data element in the second source packed data operand in a corresponding relative position within the operands to provide a plurality of pairs of corresponding data elements. For example, $A_1$ may correspond to $B_1$, $A_2$ may correspond to $B_2$, and so on.

Commonly, the number of data elements in each source packed data operand may be equal to the size in bits of the source packed data operand divided by the size in bits of each data element. In various embodiments, the widths of each of the source packed data operands may be 64-bits, 128-bits, 256-bits, 512-bits, or 1024-bits, although the scope of the invention is not so limited. In various embodiments, the width of each data element may be 8-bits, 16-bits, 32-bits, or 64-bits, although the scope of the invention is not so limited. Other packed data operand sizes and data elements widths are also suitable. As shown in the illustration, each of the data elements of the first source packed data operand 310 may have a size (S) in bits (e.g., 8-bits, 16-bits, 32-bits, or 64-bits). Often, both source packed data operands will have the same widths, and the data elements in both the source packed data operands will have the same widths. However, in other cases it is contemplated that one of the source operands may be wider than the other source operand, and may have wider data elements than those of the other source operand.

In the illustrated embodiment, the instruction also specifies or otherwise indicates a third source packed data operand 314 having multiple shift counts, although this is not required. The illustrated third source packed data operand has a shift count 1 ($C_1$) through a shift count N ($C_N$). Each shift count may correspond to a pair of corresponding data elements from the first and second source operands in a same relative position within the operands. For example, $C_1$ may correspond to the pair $A_1/B_1$, $C_N$ may correspond to the pair $A_N/B_N$, and so on. Each shift count may provide a potentially and/or optionally different value (e.g., a number of bits) that the corresponding pair of data elements from the first and second source operands may be shifted based upon. For example, $C_1$ may specify a shift count of three bits for application to $A_1$ and/or $B_1$, $C_N$ may specify a shift count of nine bits for application to $A_N$ and/or $B_N$, etc. In some embodiments, some or all of the bits of the least significant byte of each data element of the third source packed data operand may potentially/optionally have a different value (e.g., a number of bits) representing a shift count. By way of example, in the case of 32-bit data elements, the five least significant bits of the first byte of each data element may be able to uniquely specify any shift count ranging from 0-bits to 32-bits. In some embodiments, the shift counts may indicate a number of bits to shift. It is also contemplated that the shift counts could instead specify a number of bytes to shift, or some other granularity of number of bits to shift.

In an alternate embodiment, instead of the third source packed data operand 314 having the multiple packed shift counts, the instruction may specify or otherwise indicate a single scalar shift count that is to correspond to all pairs of data elements from the first and second source packed data operands. In some embodiments, an immediate of the instruction may provide the single scalar shift count. In other embodiments, the instruction may specify or otherwise indicate a general-purpose register, or other storage location, having the single scalar shift count. In still other embodiments, the instruction may specify or otherwise indicate a source packed data operand having the single scalar shift count. For example, the single scalar shift count may be provided by a first byte of a least significant data element of the source packed data operand. The other more significant data elements would not provide additional shift counts.

Referring again to FIG. 3, a result packed data operand 316 may be generated (e.g., by an execution unit) and stored in a destination storage location in response to the packed two source inter-element shift merge right instruction. The destination storage location may be specified or otherwise indicated by the instruction. In various embodiments, the destination storage location may be a packed data register, a memory location, or other storage location. The result packed data operand may include a plurality of result data elements. In some embodiments, each result data element ($R_i$) may have a value equal to a result that would be achieved if the corresponding data element ($A_i$) from the first source packed data operand were logically shifted right ($>>_{log}$) by the corresponding shift count ($C_i$), and logically OR'd with, the corresponding data element ($B_i$) from the second source packed data operand left shifted ($<<$) by a difference between a size (S) of the corresponding data element from the first source packed data operand and the corresponding shift count ($C_i$). For example, the least significant result data element ($R_1$) may store a result equal to ($A_1>>_{log}C_1$) OR ($B_1<<(S—C_1)$). The least significant result data element ($R_1$) may store $C_1$ least significant bits (LSB) portion of $B_1$ in $C_1$ most significant bits (MSB) portion of the result data element, and may store (S—$C_1$) most significant bits portion of $A_1$ in (S—$C_1$) least significant bits portion of the result data element. Similarly, the most significant result data element ($R_N$) may store a result equal to ($A_N>>_{log}C_N$) OR ($B_N<<(S—C_N)$). The most significant result data element ($R_N$) may store $C_N$ least significant bits portion of $B_N$ in $C_N$ most significant bits portion of the result data element, and may store (S—$C_N$) most significant bits portion of $A_N$ in (S—$C_N$) least significant bits portion of the result data element.

The following pseudocode represents one particular example embodiment of a packed bit shift merge right instruction with the pneumonic vpsrlv2d:

```
vpsrlv2d dst/src1, src2, src3
For (int i = 0; i < 16; i++) {   // every 32-bit data element
    unsigned int count = src3[i*32: i*32 + 5]; // 5 LSB have 0-32 bit shift count
    unsigned int hi = src2[i*32:i*32 + 31];
    unsigned int lo = src1[i*32:i*32 + 31];
    dst[i*32:i*32 + 31] = ZeroExtend(lo>>count) | ZeroExtend
    (hi<<(32-count));}
```

In the pseudocode, src1, src2, and src3, respectively, represent first, second, and third source packed data operands. Src1 is also used as a destination operand (dst). In this particular example embodiment, each of src1, src2, src3, and dst is a 512-bit packed data operand having 32-bit doubleword (dword) data elements. Other embodiments pertain to 128-bit, 256-bit, or 1024-bit operands having 8-bit byte, 16-bit word, or 64-bit quadword data elements. The symbol "<<" indicates a left shift operation. The symbol ">>" indicates a right shift operation. For example, in hexadecimal notation, "0x03<<4" means shift the value "0x03" to the right by four bits, which gives the result "0x30". Src1 and src2 each provide data elements to be shifted. Src3 provides a packed shift count operand with a potentially/optionally different shift count specified in the least significant 5-bits of each data element. The 5-bits is sufficient to specify any of 32-bit shift counts, but other numbers of bits may be used to specify shift counts for larger or smaller data elements. In still other embodiments, a single scalar shift count may be used instead of multiple potentially different shift counts. The scalar shift count could be provided in an immediate, a least significant byte of a least significant data element of a packed data register, or a general-purpose register. ZeroExtend means a zero is inserted at the opposite end of the data element for each bit shifted out on the other end (e.g., to achieve a shift right logical and shift left logical). The symbol "|" indicates a logical OR operation on the two shifted results. For example, in hexadecimal notation, "0x03|0x30" equals "0x33." The expression "ZeroExtend (lo>>count)|ZeroExtend(hi<<(32-count))" means two shift operations are performed. A left shift operation on the "hi" parameter is performed by (32-count) bits to achieve a first intermediate result. A right shift logical operation on the "lo" parameter is performed by "count" bits to achieve a second intermediate result. Afterwards, a logical OR operation is performed on the two intermediate results to provide the final result.

Figure 4:
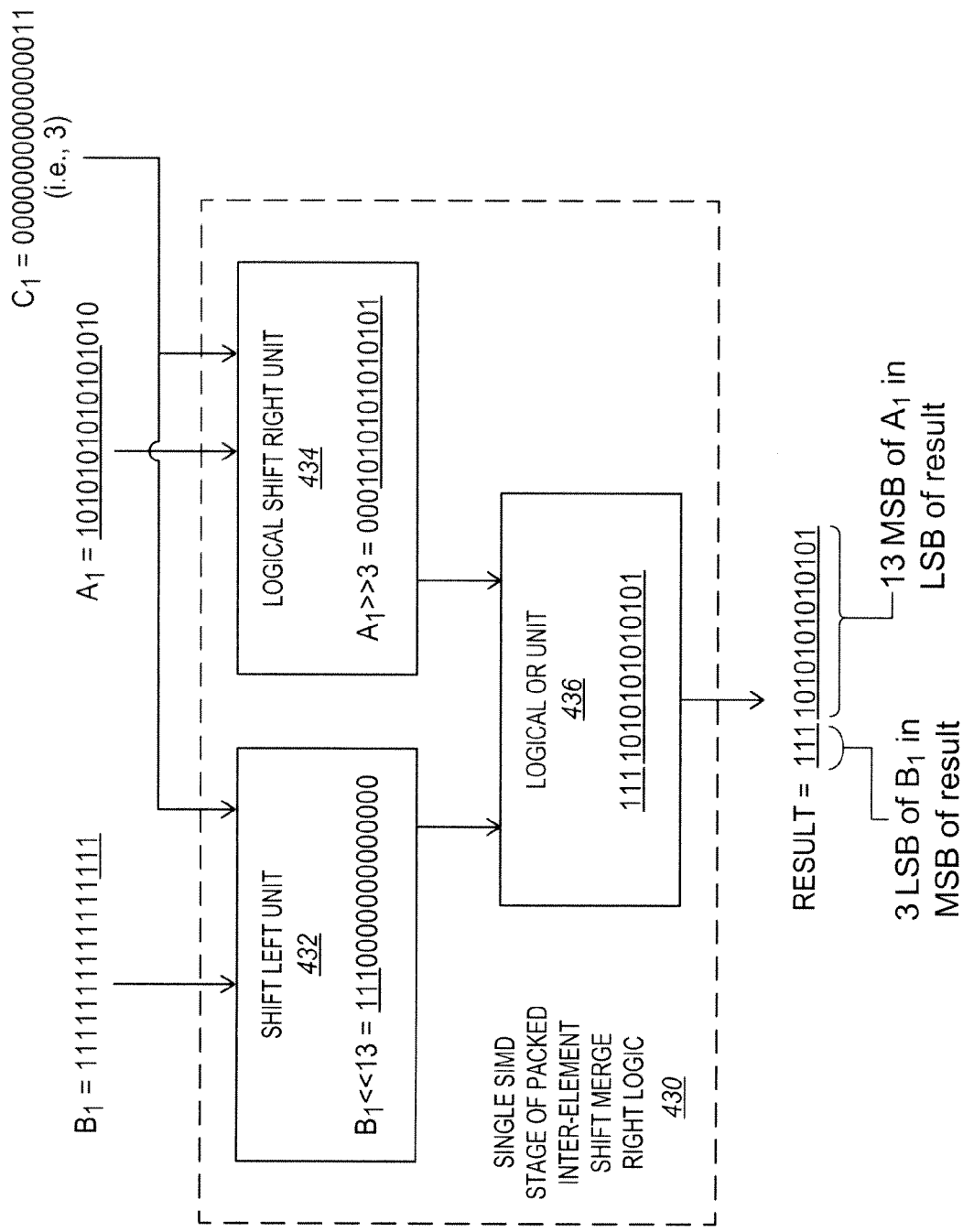
FIG. 4 is a block diagram of a first example embodiment of a micro-architectural implementation of a single SIMD stage of packed inter-element shift merge right logic.

FIG. 4 is a block diagram of a first example embodiment of a micro-architectural implementation of a single SIMD stage of packed inter-element shift merge right logic 430. Source data elements $A_1$, $B_1$, and $C_1$ are provided to the logic. In the illustrated example the data elements are 16-bit data elements, although the scope of the invention is not so limited. In the illustrated example, the data element $A_1$ has the value 1010101010101010, the data element $B_1$ has the value 1111111111111111, and the data element $C_1$ has the value 0000000000000011, although these are only examples. Underlining is used in the data elements $A_1$ and $B_1$ to indicate those bits which will appear in the result data element. The data element $C_1$ provides the shift count, which in this example is a shift count of 3-bits.

The data element $A_1$ is provided to a logical shift right unit 432. The data element $B_1$ is provided to a shift left unit 434. The data element $C_1$, or at least its shift count of 3-bits, is also provided to both the shift left unit and the logical shift right unit. The logical shift right unit is operable to logically right shift the data element $A_1$ by the shift count (e.g., in this example by 3-bits) to produce a first intermediate result having a value 0001010101010101 (i.e., =$A_1>>_{log}$ 3). Because it is a logical shift right, zeros are inserted for each bit shifted out. The shift left unit is operable to left shift the data element $B_1$ by a difference between the size of the data element $B_1$ and the shift count (e.g., in this example by 13-bits=16-bits minus 3-bits) to produce a second intermediate result having a value 1110000000000000 (i.e., =$B_1<<13$). Zeros are also inserted for each bit shifted out. Notice that $A_1$ and $B_1$ are shifted in different directions. Notice also that one is shifted by the shift count while the other is shifted by the data element size minus the shift count.

A logical OR unit 436 is coupled with each of the shift left unit 432 and the logical shift right unit 434 to receive the first and second intermediate results. The logical OR unit is operable to perform a logical OR operation on the first and second intermediate results to logically combine them to generate the result data element. As shown, in this example, the result data element has the value 1111010101010101. Notice that the result data element has three least significant bits (LSB) of $B_1$ in three most significant bits (MSB) of the result data element, and thirteen MSB of $A_1$ in thirteen LSB of the result data element.

Figure 5:
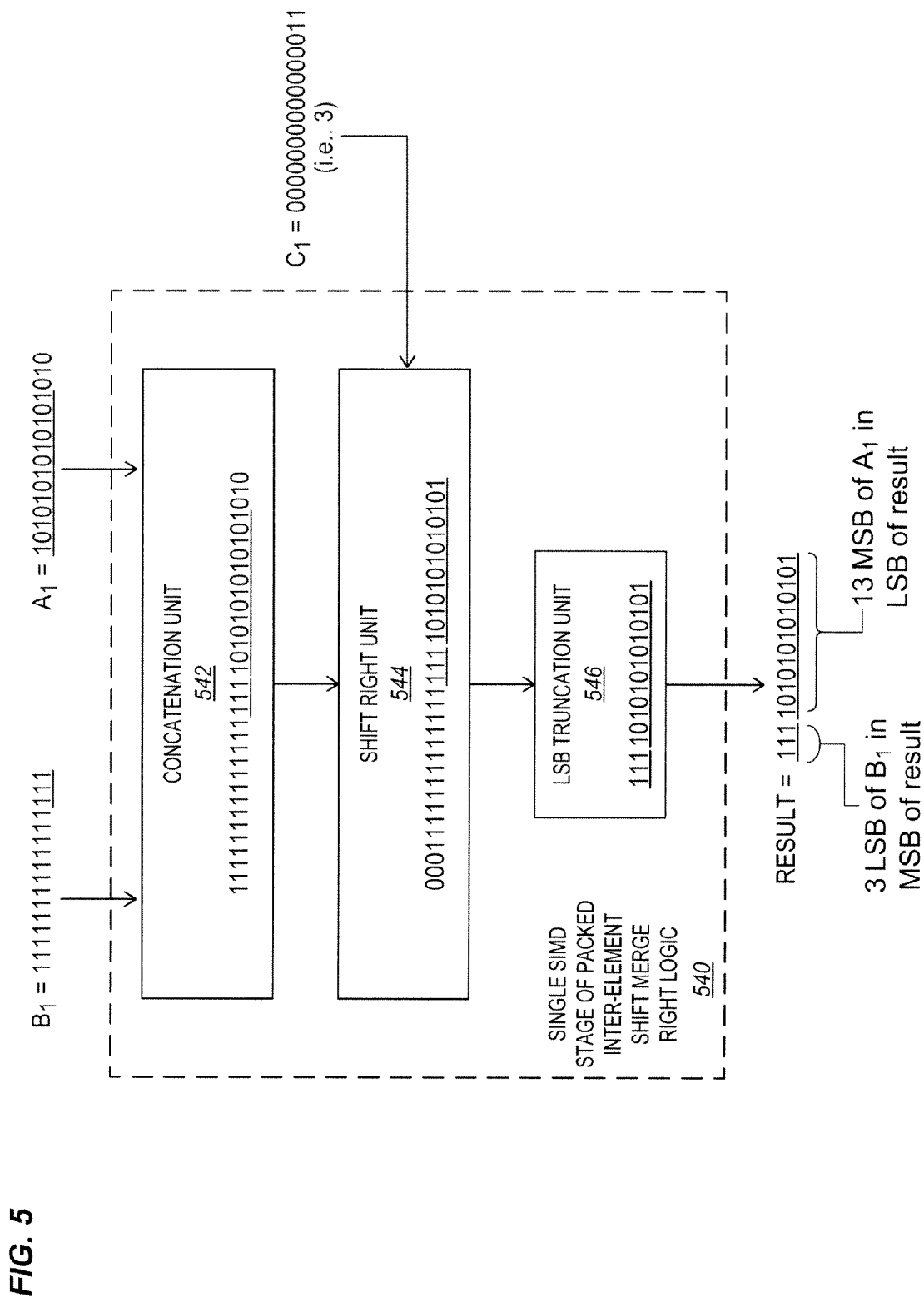
FIG. 5 is a block diagram of a second example embodiment of a micro-architectural implementation of a single SIMD stage of packed inter-element shift merge right logic.

FIG. 5 is a block diagram of a second example embodiment of a micro-architectural implementation of a single SIMD stage of packed inter-element shift merge right logic 540. Source data elements $A_1$, $B_1$, and $C_1$ are provided to the logic. In the illustrated example the data elements are 16-bit data elements, although the scope of the invention is not so limited. In the illustrated example, the data element $A_1$ has the value 1010101010101010, the data element $B_1$ has the value 1111111111111111, and the data element $C_1$ has the value 0000000000000011, although these are only examples. Underlining is used in the data elements $A_1$ and $B_1$ to indicate those bits which will appear in the result data element. The data element $C_1$ provides the shift count, which in this example is a shift count of 3-bits.

The data elements $A_1$ and $B_1$ are provided to a concatenation unit 542. The concatenation unit is operable to concatenate the bits of $A_1$ and $B_1$ into an intermediate result that has twice as many bits. In this example, $B_1$ is concatenated into a most significant position and $A_1$ into a least significant position. In this example, the intermediate result has the value 11111111111111111010101010101010. The concatenation unit is coupled with a shift right unit 544. The intermediate result is provided to the shift right unit. The data element $C_1$, or at least its shift count of 3-bits, is also provided to the shift right unit. The shift right unit is operable to right shift the intermediate result by the shift count number of bits to produce a second intermediate result. In this case, a logical shift right is shown, although this is not required. In this example, the second intermediate result has a value 00011111111111111111010101010101.

A least significant bit (LSB) truncation unit 546 is coupled with an output of the shift right unit. The LSB truncation unit is operable to truncate a LSB portion of the shifted intermediate result having a size in bits equal to the result data element size. For example, the LSB truncation unit may truncate a more significant portion of the shifted intermediate result that does not fit in the result data element. The LSB truncation unit outputs the result data element. As shown, in this example, the result data element has the value 1111010101010101. Notice that the result data element has three least significant bits (LSB) of $B_1$ in three most significant bits (MSB) of the result data element, and thirteen MSB of $A_1$ in thirteen LSB of the result data element.

Figure 6:
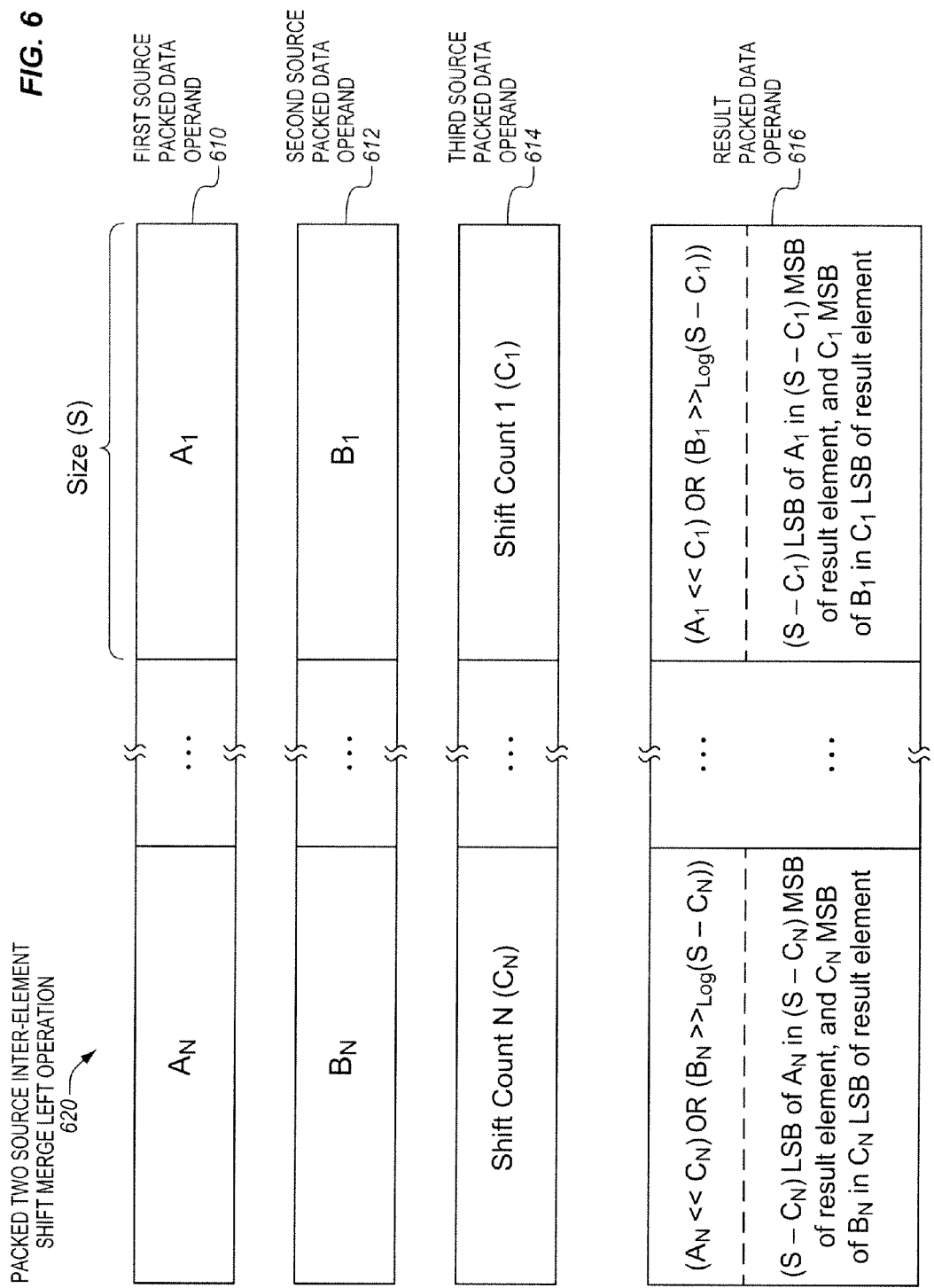
FIG. 6 is a block diagram illustrating an embodiment of a packed two source inter-element shift merge left operation.

FIG. 6 is a block diagram illustrating an embodiment of a packed two source inter-element shift merge left operation 620 that may be performed in response to an embodiment of a packed two source inter-element shift merge left instruction. The shift merge left operation of FIG. 6 has certain similarities to the shift merge right operation of FIG. 3. To avoid obscuring the description, the different and/or additional characteristics for the shift merge left of FIG. 6 will primarily be described, without repeating all the optionally similar or common characteristics and details relative to the shift merge right operation of FIG. 3. However, it is to be appreciated that the previously described characteristics and details of the shift merge right operation of FIG. 3 may also optionally apply to the shift merge left operation of FIG. 6, unless stated otherwise or otherwise clearly apparent.

The instruction may specify or otherwise indicate a first source packed data operand 610 having a first plurality of data elements $A_1$-$A_N$. The instruction may specify or otherwise indicate a second source packed data operand 612 having a second plurality of data elements $B_1$-$B_N$. Each data element in the first source packed data operand may correspond to a different data element in the second source packed data operand in a corresponding relative position within the operands to provide a plurality of pairs of corresponding data elements. The source operands and their data elements may have any of the sizes described elsewhere herein. As shown in the illustration, each of the data elements of the first source packed data operand 610 may have a size (S) in bits (e.g., 8-bits, 16-bits, 32-bits, or 64-bits).

In the illustrated embodiment, the instruction also specifies or otherwise indicates a third source packed data operand 614 having multiple shift counts $C_1$-$C_N$. Each shift count may correspond to a pair of corresponding data elements from the first and second source operands in a same relative position within the operands. In an alternate embodiment, the instruction may specify or otherwise indicate a single scalar shift count that is to correspond to all pairs of data elements from the first and second source packed data operands. The single scalar shift count may be provided by an immediate, a general-purpose register, a packed data operand, or otherwise.

Referring again to FIG. 6, a result packed data operand 616 may be generated (e.g., by an execution unit) and stored in a destination storage location in response to the packed two source inter-element shift merge right instruction. In various embodiments, the destination storage location may be a packed data register, a memory location, or other storage location. The result packed data operand may include a plurality of result data elements. In some embodiments, each result data element ($R_i$) may have a value equal to a result that would be achieved if the corresponding data element ($A_i$) from the first source packed data operand were shifted left (<<) by the corresponding shift count ($C_i$), and logically OR'd with, the corresponding data element ($B_i$) from the second source packed data operand logically shifted right ($>>_{log}$) by a difference between a size (S) of the corresponding data element from the first source packed data operand and the corresponding shift count ($C_i$). For example, the least significant result data element ($R_1$) may store a result equal to $(A_1<<C_1)$ OR $(B_1>>_{log}(S-C_1))$. The least significant result data element ($R_1$) may store (S—$C_1$) least significant bits (LSB) portion of $A_1$ in (S—$C_1$) most significant bits (MSB) portion of the result data element, and may store $C_1$ most significant bits portion of $B_1$ in $C_1$ least significant bits portion of the result data element. Similarly, the most significant result data element ($R_N$) may store a result equal to $(A_N<<C_N)$ OR $(B_N>>_{log}(S-C_N))$. The most significant result data element ($R_N$) may store (S—$C_N$) least significant bits (LSB) portion of $A_N$ in (S—$C_N$) most significant bits (MSB) portion of the result data element, and may store $C_N$ most significant bits portion of $B_N$ in $C_N$ least significant bits portion of the result data element.

The following pseudocode represents one particular example embodiment of a packed bit shift merge left instruction with the pneumonic vpsllv2d:

```
vpsllv2d dst/src1, src2, src3
For (int i = 0; i < 16; i++) { // every 32-bit data element
   int count = src3[i*32: i*32 + 5]; // 5 LSB have 0-32 bit shift count
   int lo = src2[i*32:i*32 + 31];
   int hi = src1[i*32:i*32 + 31];
   dst[i*32:i*32 + 31] = ZeroExtend(hi<<count) | ZeroExtend
   (lo>>(32-count));}
```

In the pseudocode, src1, src2, and src3, respectively, represent first, second, and third source packed data operands. Src1 is also used as a destination operand (dst). In this particular example embodiment, each of src1, src2, src3, and dst is a 512-bit packed data operand having 32-bit doubleword (dword) data elements. Other embodiments pertain to 128-bit, 256-bit, or 1024-bit operands having 8-bit byte, 16-bit word, or 64-bit quadword data elements. The symbol "<<" indicates a left shift operation. The symbol ">>" indicates a right shift operation. Src1 and src2 each provide data elements to be shifted. Src3 provides a packed shift count operand with a potentially/optionally different shift count specified in the least significant 5-bits of each data element. The 5-bits is sufficient to specify any of 32-bit shift counts, but other numbers of bits may be used to specify shift counts for larger or smaller data elements. Moreover, in other embodiments, a single scalar shift count may be used instead of multiple potentially/optionally different shift counts. The scalar shift count could be provided in an immediate, a least significant byte of a least significant data element of a packed data register, or a general-purpose register. ZeroExtend means a zero is inserted at the opposite end of the data element for each bit shifted out on the other end (e.g., to achieve a shift right logical and shift left logical). The symbol "|" indicates a logical OR operation on the two shifted results. The expression "ZeroExtend (hi<<count)|ZeroExtend(lo>>(32-count))" means two shift operations are performed. A left shift logical operation on the "hi" parameter is performed by "count" bits to achieve a first intermediate result. A right shift operation on the "lo" parameter is performed by (32-count) bits to achieve a second intermediate result. Afterwards, a logical OR operation is performed on the two intermediate results to provide the final result.

Figure 7:
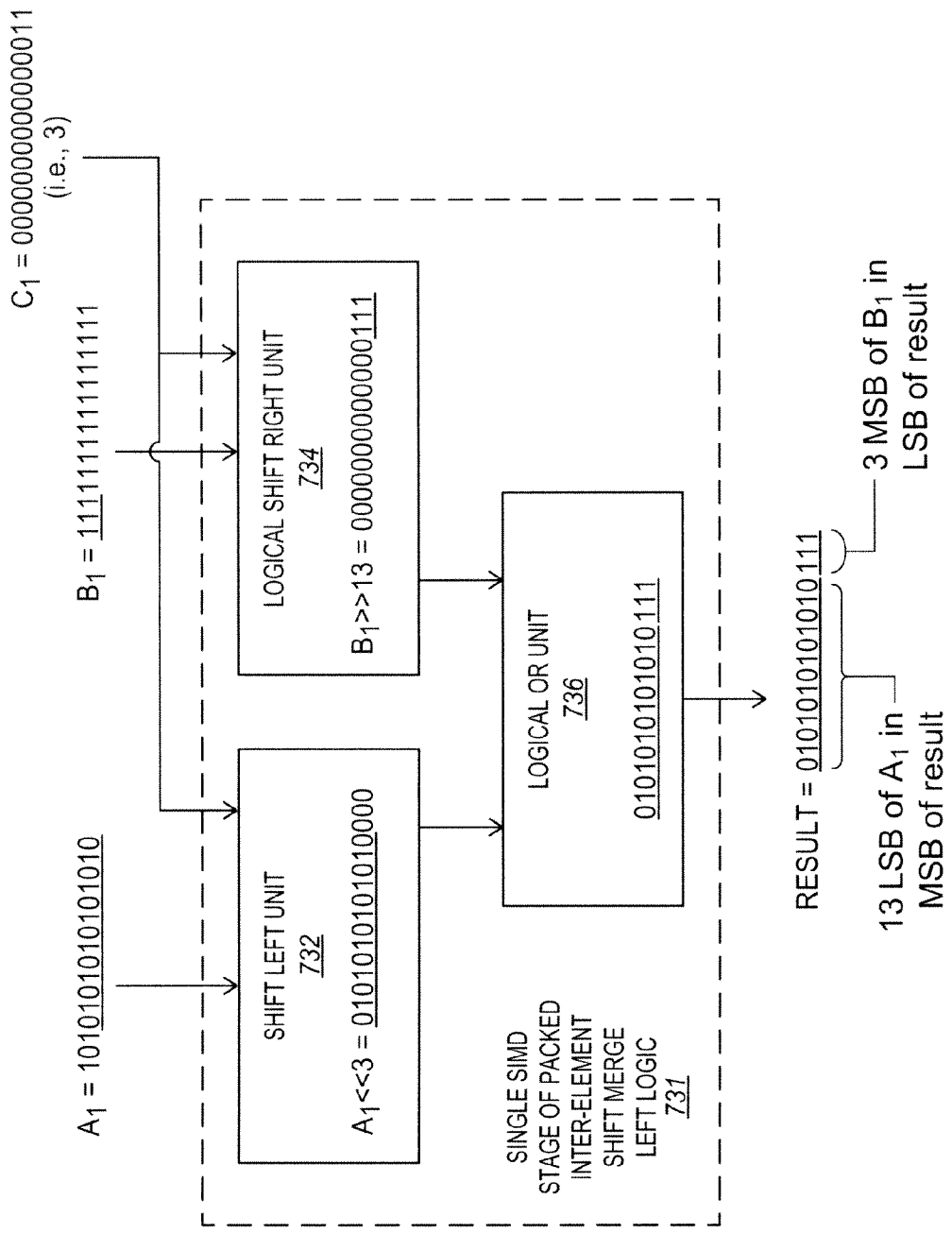
FIG. 7 is a block diagram of a first example embodiment of a micro-architectural implementation of a single SIMD stage of packed inter-element shift merge left logic.

FIG. 7 is a block diagram of a first example embodiment of a micro-architectural implementation of a single SIMD stage of packed inter-element shift merge left logic 731. Source data elements $A_1$, $B_1$, and $C_1$ are provided to the logic. In the illustrated example the data elements are 16-bit data elements, although the scope of the invention is not so limited. In the illustrated example, the data element $A_1$ has the value 1010101010101010, the data element $B_1$ has the value 1111111111111111, and the data element $C_1$ has the value 0000000000000011, although these are only examples. Underlining is used in the data elements $A_1$ and $B_1$ to indicate those bits which will appear in the result data element. The data element $C_1$ provides the shift count, which in this example is a shift count of 3-bits.

The data element $A_1$ is provided to a shift left unit 732. The data element $B_1$ is provided to logical shift right unit 734. The data element $C_1$, or at least its shift count of 3-bits, is also provided to both the shift left unit and the logical shift right unit. The shift left unit is operable to left shift the data element $A_1$ by the shift count (e.g., in this example by 3-bits) to produce a first intermediate result having a value 0101010101010000 (i.e., $=A_1<<3$). Zeros are inserted for each bit shifted out. The logical shift right unit is operable to logically right shift the data element $B_1$ by a difference between the size of the data element $B_1$ and the shift count (e.g., in this example by 13-bits) to produce a second intermediate result having a value 0000000000000111 (i.e., $=B_1>>_{log} 13$). Because it is a logical shift right, zeros are inserted for each bit shifted out. Notice that $A_1$ and $B_1$ are shifted in different directions. Notice also that one is shifted by the shift count while the other is shifted by the data element size minus the shift count.

A logical OR unit 736 is coupled with each of the shift left unit 732 and the logical shift right unit 734 to receive the first and second intermediate results. The logical OR unit is operable to perform a logical OR operation on the first and second intermediate results to logically combine them to generate the result data element. As shown, in this example, the result data element has the value 0101010101010111. Notice that the result data element has thirteen least significant bits (LSB) of $A_1$ in thirteen most significant bits (MSB) of the result data element, and three MSB of $B_1$ in three LSB of the result data element.

Figure 8:
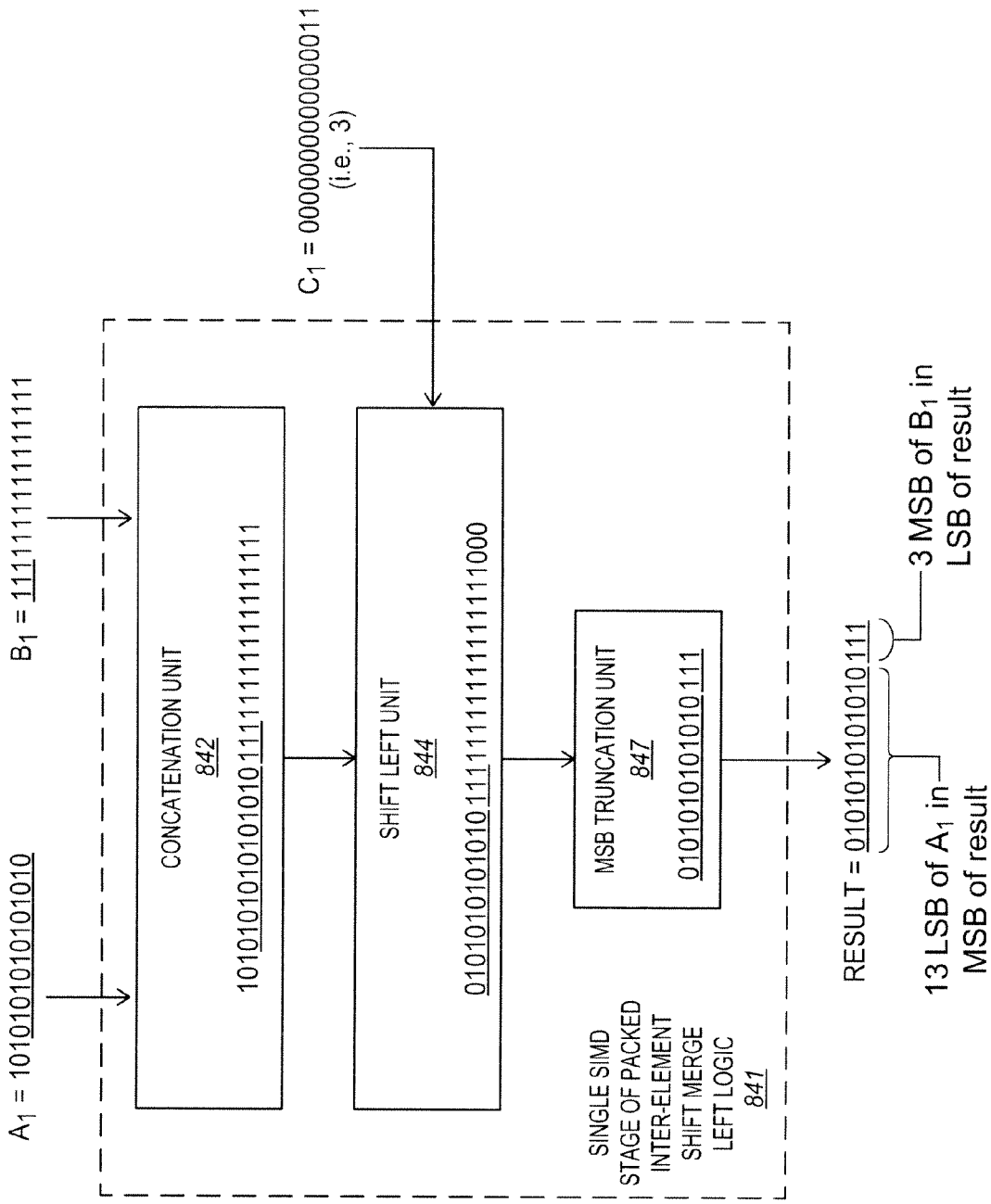
FIG. 8 is a block diagram of a second example embodiment of a micro-architectural implementation of a single SIMD stage of packed inter-element shift merge left logic.

FIG. 8 is a block diagram of a second example embodiment of a micro-architectural implementation of a single SIMD stage of packed inter-element shift merge left logic 841. Source data elements $A_1$, $B_1$, and $C_1$ are provided to the logic. In the illustrated example the data elements are 16-bit data elements, although the scope of the invention is not so limited. In the illustrated example, the data element $A_1$ has the value 1010101010101010, the data element $B_1$ has the value 1111111111111111, and the data element $C_1$ has the value 0000000000000011, although these are only examples. Underlining is used in the data elements $A_1$ and $B_1$ to indicate those bits which will appear in the result data element. The data element $C_1$ provides the shift count, which in this example is a shift count of 3-bits.

The data elements $A_1$ and $B_1$ are provided to a concatenation unit 842. The concatenation unit is operable to concatenate the bits of $A_1$ and $B_1$ into an intermediate result that has twice as many bits. In this example, $A_1$ is concatenated into a most significant position and $B_1$ into a least significant position. In this example, the intermediate result has the value 10101010101010101111111111111111. A shift left unit 844 is coupled with the concatenation unit to receive the intermediate result. The data element $C_1$, or at least its shift count of 3-bits, is also provided to the shift left unit. The shift left unit is operable to left shift the intermediate result by the shift count number of bits to produce a second intermediate result. In this example, the second intermediate result has a value 01010101010101111111111111111000.

A most significant bit (MSB) truncation unit 847 is coupled with an output of the shift left unit. The MSB truncation unit is operable to truncate a MSB portion of the shifted intermediate result having a size in bits equal to the result data element size. The MSB truncation unit outputs the result data element. As shown, in this example, the result data element has the value 0101010101010111. Notice that the result data element has thirteen least significant bits (LSB) of $A_1$ in thirteen most significant bits (MSB) of the result data element, and three MSB of $B_1$ in three LSB of the result data element.

Figure 9:
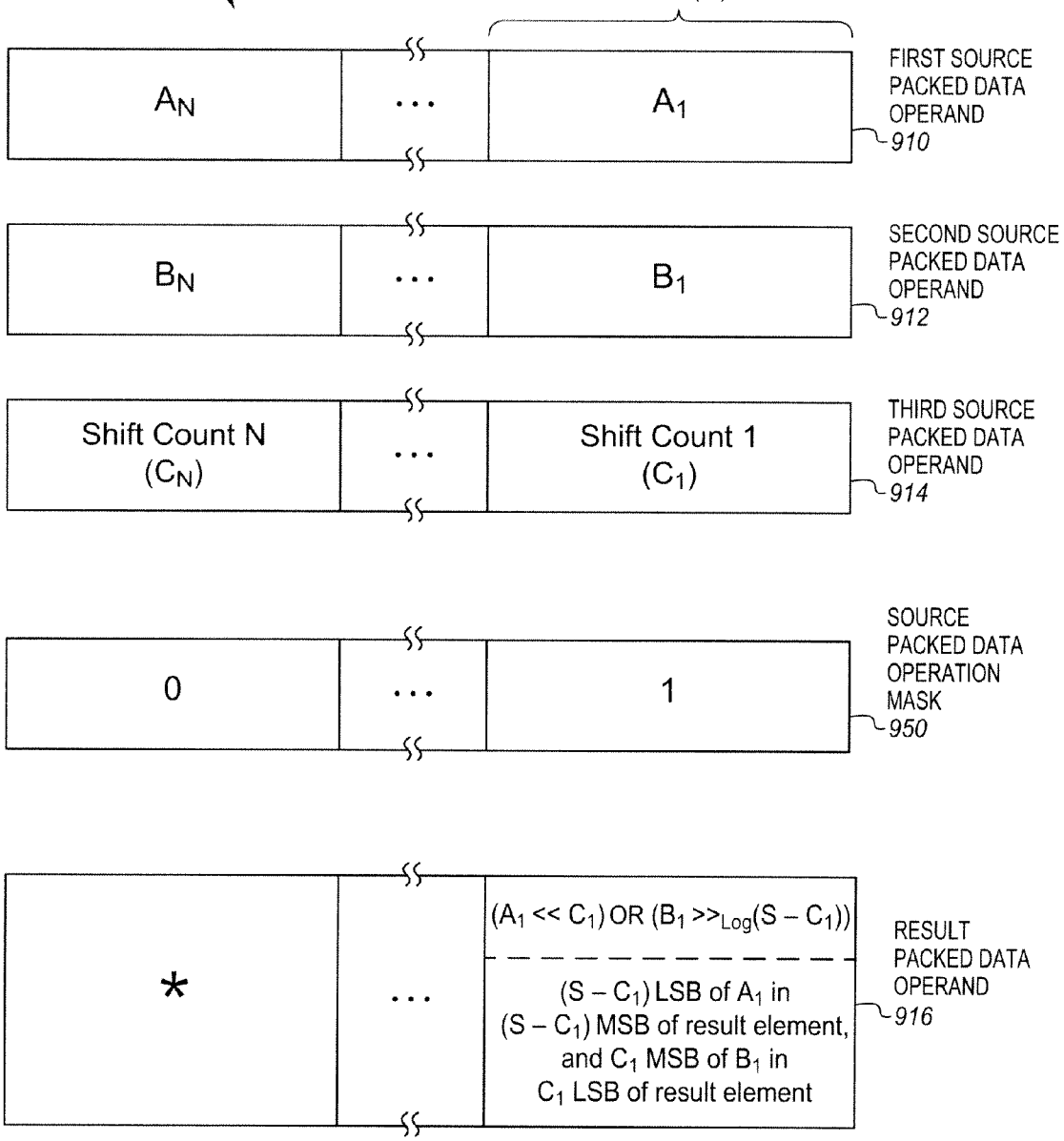
FIG. 9 is a block diagram illustrating an embodiment of a masked packed two source inter-element shift merge right operation.

FIG. 9 is a block diagram illustrating an embodiment of a masked packed two source inter-element shift merge right operation 920 that may be performed in response to an embodiment of a masked packed two source inter-element shift merge right instruction. The masked operation of FIG. 9 has certain similarities to the unmasked operation of FIG. 3. To avoid obscuring the description, the different and/or additional characteristics for the masked operation of FIG. 9 will primarily be described, without repeating all the optionally similar or common characteristics and details relative to the unmasked operation of FIG. 3. However, it is to be appreciated that the previously described characteristics and details of the unmasked operation of FIG. 3 may also optionally apply to the masked operation of FIG. 9, unless stated otherwise or otherwise clearly apparent.

As before, the masked instruction may indicate a first source packed data operand 910, a second source packed data operand 912, and a third source packed data operand 914 (or otherwise indicate at least one shift count). Each of these operands may be similar to, or the same as, the corresponding operands of FIG. 3, and may have the previously described variations and alternatives.

The masked instruction may additionally specify (e.g., explicitly specify) or otherwise indicate (e.g., implicitly indicate) a source packed data operation mask 950. The packed data operation mask may also be referred to herein simply as an operation mask, predicate mask, or mask. The mask may represent a predicate operand or conditional control operand that is used to predicate, conditionally control, or mask whether or not corresponding operations are to be performed and/or corresponding results are to be stored. In some embodiments, the masking or predication may be at per-data element granularity such that operations on different pairs of corresponding data elements may be predicated or conditionally controlled separately and/or independently of others. The mask may include multiple mask elements, predicate elements, or conditional control elements. In one aspect, the mask elements may be included in a one-to-one correspondence with corresponding pairs of source data elements and/or corresponding result data elements. As shown, in some embodiments, each mask element may be a single mask bit. In such cases, the mask may have a bit for each data element in the first source packed data operand and/or each result data element. A value of each mask bit may control whether or not a corresponding operation is to be performed and/or a corresponding result data element is to be stored. Each mask bit may have a first value to allow the operation to be performed on the corresponding pair of source data elements and allow the corresponding result data element to be stored in the destination, or may have a second different value to not allow the operation to be performed on the corresponding pair of source data elements and/or not allow the corresponding result data element to be stored in the destination. According to one possible convention, as shown in the illustration, a mask bit cleared to binary zero (i.e., 0) may represent a masked out operation, whereas a mask bit set to binary one (i.e., 1) may represent an unmasked operation. In other embodiments, two or more bits may optionally be used for each mask element (e.g., each mask element may have a same number of bits as each corresponding source data element).

The embodiment of the masked operation 920 may be performed in response to and/or as a result of the embodiment of the masked instruction. The masked operation may be performed subject to the masking, predication, or conditional control of the source packed data operation mask 950. As before, a result packed data operand 916 may be generated (e.g., by an execution unit) and stored in a destination storage location (e.g., a packed data register) in response to the masked instruction. The result packed data operand may include a plurality of result data elements that each correspond to a different pair of source data elements in a same relative position.

The result data elements corresponding to unmasked mask elements may have values similar to or the same as those previously described for FIG. 3. In the illustrated example, the least significant result data element ($R_1$) has the same value as previously described for FIG. 3, since it's corresponding mask element is unmasked (e.g., set to 1).

In contrast, the result data elements corresponding to masked-out mask elements may have values that do not depend on the packed two source shift merge right operation performed on the corresponding pair of source data elements. Rather, these result data elements may have fixed or predetermined values. For example, either the corresponding packed two source shift merge right operation need not be performed, or if the corresponding packed two source shift merge right operation is performed then the corresponding result need not be stored in the destination. Rather, a fixed or predetermined value may be stored in the corresponding result data element.

In the illustrated example, the most significant result data element ($R_N$) corresponding to a masked-out mask element has an asterisk (*) to represent such a fixed or predetermined value. The particular fixed or predetermined value may depend on the type of masking used for the particular implementation. In some embodiments, zeroing masking may be used. In zeroing masking, the masked-out result data elements may be zeroed-out (e.g., be forced to have a value of zero). In other embodiments, merging masking may be used. In merging masking, the masked-out result data elements may have a value of one of the corresponding source data elements (e.g., the corresponding source data element from one of the first and second source packed data operands may be passed through to the masked-out result data element).

The packed two source inter-element shift merge instructions disclosed herein are general-purpose instructions that have general-purpose uses. For example, these instructions may be used, either alone or in combination with other instructions, to perform inter-element shift merge operations on data elements in two source operands and/or combine bits from corresponding data elements from two source operands as needed or useful in various different ways for various different applications, algorithms, or codes.

In some embodiments, the packed two source inter-element shift merge instructions disclosed herein may be used to decompress data that has been compressed. Database applications often compress data (e.g., 32-bit data elements) into smaller bit fields (e.g., 17-bits) to allow the working set size to fit in memory. In other words, in some cases only a portion (e.g., a lowest order portion) of the data elements may contain the information that is needed to be retained. For example, it may be known for certain applications and/or certain types of data that only the lowest order 17-bits of a 32-bit data element contain the useful information, whereas all more significant bits may represent don't care values that may optionally be eliminated so that the data can fit in less total memory space.

Figure 10:
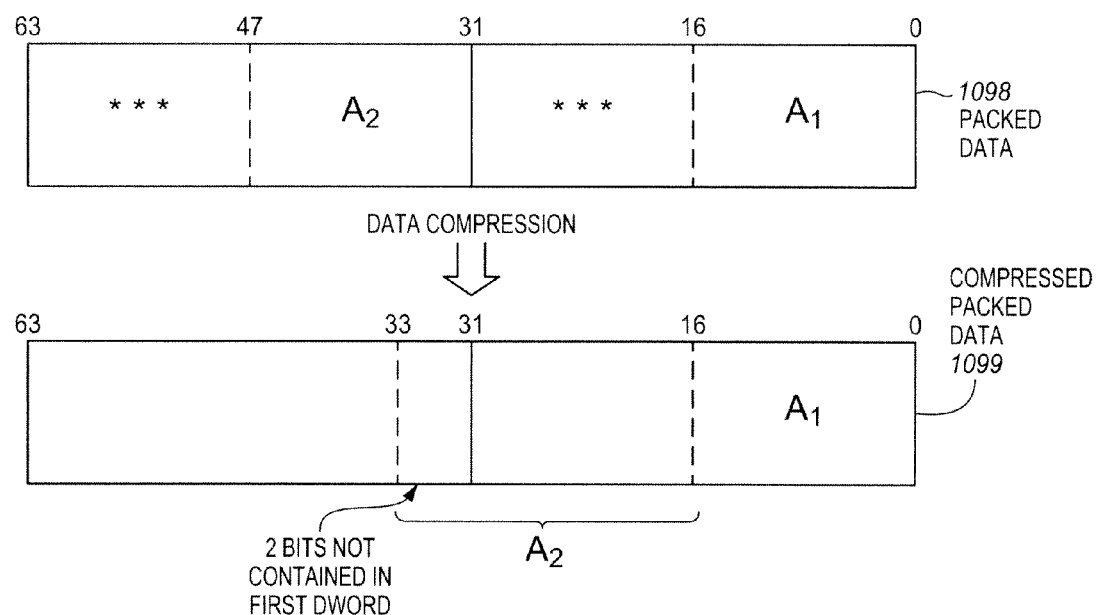
FIG. 10 is a block diagram of an example embodiment of compressing data.

FIG. 10 is a block diagram of an example embodiment of an approach for compressing data elements. A packed data 1098 having two 32-bit data elements R0 and R1 is shown. Bits [16:0] of the lowest order data element represent a value $X_0$ and bits [47:32] of the next highest order data element represent a value $X_1$. Bits [31:17] and [63:48] may represent don't care values that may be eliminated, as indicated by the asterisks (*). A compression operation may be performed to form a compressed packed data. The compressed packed data 1099 has the value $X_0$ in bits [16:0]. Bits [31:17] of the original packed data (i.e., the *) have been eliminated. The elimination of these bits may help to reduce the amount of storage needed to store the values $X_0$ and $X_1$. The entire value $X_1$ does not fit within the remaining bits of the lowest order 32-bit data element. Rather, bits [31:17] of the lowest order data element store a lowest order portion of the value $X_1$, and bits [33:32] of the next highest order data element may store a remaining 2-bit most significant portion of the value $X_1$. That is, the most significant 2-bits of the value of $X_1$ are not contained in the lowest order 32-bit data.

As described above, 32-bit elements may be compressed into 17-bit elements, which may help to reduce the amount of storage needed to store the elements. When they are needed, it is generally useful to decompress the compressed 17-bit values back into 32-bit format for easier processing. Initially, the compressed 17-bit data elements may be laid out in memory with element $X_0$ in bits [16:0], $X_1$ in bits [33:17], $X_2$ in bits [50:34], $X_3$ in bits [67:51], $X_4$ in bits [84:68], $X_5$ in bits [101:85], $X_6$ in bits [118:102], and $X_7$ in bits [135:119].

A permute operation may be performed to prepare the data for an embodiment of the packed two source inter-element shift merge right instruction. This may produce a first source packed data operand and a second source packed data operand for the packed two source inter-element shift merge right instruction. The first source packed data operand may have $A_0$ in bits [31:0], $A_1$ in bits [31:0], $A_2$ in bits [63:32], $A_3$ in bits [63:32], $A_4$ in bits [95:64], $A_5$ in bits [95:64], $A_6$ in bits [127:96], and $A_7$ in bits [127:96]. $A_0$ may hold $X_0$ LSB, $A_1$ may hold $X_1$ LSB, $A_2$ may hold $X_2$ LSB, $A_3$ may hold $X_3$ LSB, $A_4$ may hold $X_4$ LSB, $A_5$ may hold $X_5$ LSB, $A_6$ may hold $X_6$ LSB, and $A_7$ may hold $X_7$ LSB The second source packed data operand may have $A_0$ in bits [31:0], $A_1$ in bits [63:32], $A_2$ in bits [63:32], $A_3$ in bits [95:64], $A_4$ in bits [95:64], $A_5$ in bits [127:96], $A_6$ in bits [127:96], and $A_7$ in bits [159:128]. $A_0$ may hold $X_0$ MSB, $A_1$ may hold $X_1$ MSB, $A_2$ may hold $X_2$ MSB, $A_3$ may hold $X_3$ MSB, $A_4$ may hold $X_4$ MSB, $A_5$ may hold $X_5$ MSB, $A_6$ may hold $X_6$ MSB, and $A_7$ may hold $X_7$ MSB. A third packed shift count operand may be prepared to have shift counts $C_0$-$C_7$. $C_0$ may have a shift count of 0, $C_1$ may have a shift count of 17, $C_2$ may have a shift count of 2, $C_3$ may have a shift count of 19, $C_4$ may have a shift count of 4, $C_5$ may have a shift count of 21, $C_6$ may have a shift count of 6, and $C_7$ may have a shift count of 23. The embodiment of the packed two source inter-element shift merge right instruction on doublewords may be performed to store a result. The result may include $R_0$ bits [31:0], $R_1$ bits [48:17], $R_2$ bits [65:34], $R_3$ bits [82:51], $R_4$ bits [99:68], $R_5$ bits [126:85], $R_6$ bits [133:102], and $R_7$ bits [150:119]. A logical AND operation with a value 0x0001ffff may be performed on each element to clear out the don't care bits from the $R_i$ elements and turn them into the desired uncompressed data elements.

The following is one possible example of pseudocode that uses the packed two source inter-element shift merge right instruction (labeled vpsrlv2d) to expand compressed data:

```
loop:
   vmovups zmm4, k0, zmmword ptr [rcx]    // loads 512-bit vector
   add r8d, 0x10
   vpermd zmm5, k0, zmm3, zmm4 //elem hi    // permute order of elements
   lea rcx, ptr [rcx+rax*2]
   vpermd zmm6, k0, zmm2, zmm4 //elem lo    // permute order of elements
   vpsrlv2d zmm6, k0, zmm5, zmm1    // Right inter-element bit shift merge instruction
   pandd zmm7, k0, zmm6, zmm0    // logical AND operation between two vectors
   vmovups zmmword ptr [rsi], k0, zmm7    // stores 512-bit vector
   add rsi, 0x40
   cmp r8d, edx
   jl loop
```

In the above pseudocode, the "k0" means that the operation is performed without masking/predication.

Figure 11:
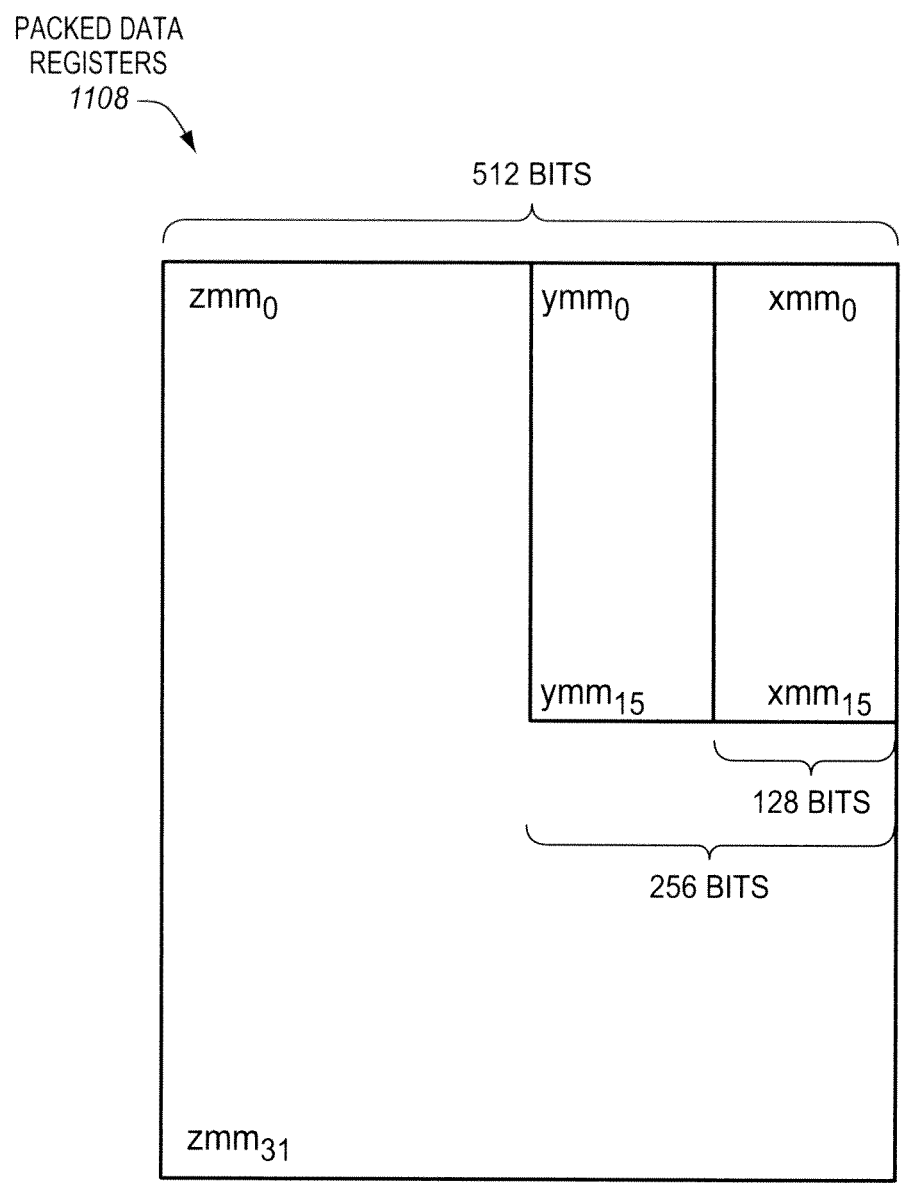
FIG. 11 is a block diagram of an embodiment of a set of packed data registers.

FIG. 11 is a block diagram of an example embodiment of a suitable set of packed data registers 1108. The packed data registers include thirty-two 512-bit packed data registers labeled ZMM0 through ZMM31. In the illustrated embodiment, the lower order 256-bits of the lower sixteen registers, namely ZMM0-ZMM15, are aliased or overlaid on respective 256-bit packed data registers labeled YMM0-YMM15, although this is not required. Likewise, in the illustrated embodiment, the lower order 128-bits of the registers YMM0-YMM15 are aliased or overlaid on respective 128-bit packed data registers labeled XMM0-XMM15, although this also is not required. The 512-bit registers ZMM0 through ZMM31 are operable to hold 512-bit packed data, 256-bit packed data, or 128-bit packed data. The 256-bit registers YMM0-YMM15 are operable to hold 256-bit packed data or 128-bit packed data. The 128-bit registers XMM0-XMM15 are operable to hold 128-bit packed data.

In some embodiments, each of the registers may be used to store either packed floating-point data or packed integer data. Different data element sizes are supported including at least 8-bit byte data, 16-bit word data, 32-bit doubleword, 32-bit single-precision floating point data, 64-bit quadword, and 64-bit double-precision floating point data. In alternate embodiments, different numbers of registers and/or different sizes of registers may be used. In still other embodiments, registers may or may not use aliasing of larger registers on smaller registers and/or may or may not be used to store floating point data.

Figure 12:
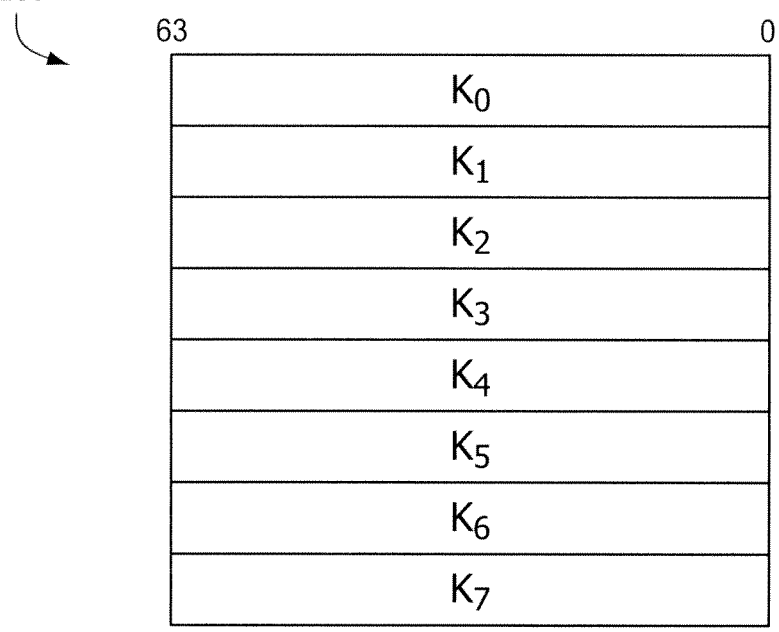
FIG. 12 is a block diagram of an embodiment of a set of packed data operation mask registers.

FIG. 12 is a block diagram of an example embodiment of a suitable set of packed data operation mask registers 1250. The packed data operation mask registers may be used to store packed data operation masks. In the illustrated embodiment, the set includes eight registers labeled k0 through k7. Alternate embodiments may include either fewer than eight registers (e.g., two, four, six, etc.), or more than eight registers (e.g., sixteen, thirty-two, etc.). In some embodiments, the instructions may encode or specify the packed data operation mask registers in different bits or one or more different fields of an instruction format than those used to encode or specify other types of registers (e.g., packed data registers). By way of example, an instruction may use three bits (e.g., a 3-bit field) to encode or specify any one of the eight packed data operation mask registers k0 through k7. In alternate embodiments, either fewer or more bits may be used, respectively, when there are fewer or more packed data operation mask registers. In the illustrated embodiment, each of the registers is 64-bits. In alternate embodiments, the widths of the registers may be either wider than 64-bits (e.g., 80-bits, 128-bits, etc.), or narrower than 64-bits (e.g., 8-bits, 16-bits, 32-bits, etc). Generally, when a single, per-element masking control bit is used, the number of bits in the packed data operation mask register that are used for masking is equal to the packed data width in bits divided by the packed data element width in bits. In accordance with the illustrated embodiment, a masked packed data instruction may access and/or utilize only the number of lowest order or least significant bits of the register used for the packed data operation mask based on that instructions associated packed data width and data element width. The registers may be implemented in different ways using well known techniques and are not limited to any known particular type of circuit. Examples of suitable registers include, but are not limited to, dedicated physical registers, dynamically allocated physical registers using register renaming, and combinations thereof.

Components, features, and details described for any of FIGS. 3-12 may also optionally be used in any of FIGS. 1-2. Moreover, components, features, and details described herein for any of the apparatus described herein may also optionally be used in and/or apply to any of the methods described herein, which in embodiments may be performed by and/or with such apparatus. Components, features and details described herein for any of the processors may optionally be used in any of the systems described herein. An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2111; and see Intel® Advanced Vector Extensions Programming Reference, June 2111).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 138 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 13A illustrates an exemplary AVX instruction format including a VEX prefix 1302, real opcode field 1330, Mod R/M byte 1340, SIB byte 1350, displacement field 1362, and IMM8 1372. FIG. 13B illustrates which fields from FIG. 13A make up a full opcode field 1374 and a base operation field 1342. FIG. 13C illustrates which fields from FIG. 13A make up a register index field 1344.

VEX Prefix (Bytes 0-2) 1302 is encoded in a three-byte form. The first byte is the Format Field 1340 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1305 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx and Bbbb may be formed by adding VEX.R, VEX.X, and VEX.B. Opcode map field 1316 (VEX byte 1, bits [4:0]-mmmmm) includes content to encode an implied leading opcode byte. W Field 1364 (VEX byte 2, bit [7]-W)—is represented by the notation VEX.W, and provides different functions depending on the instruction. The role of VEX.vvvv 1321 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 1368 Size field (VEX byte 2, bit [2]-L)=0, it indicates 138 bit vector; if VEX.L=1, it indicates 256 bit vector. Prefix encoding field 1325 (VEX byte 2, bits [1:0]-pp) provides additional bits for the base operation field.

Real Opcode Field 1330 (Byte 3) is also known as the opcode byte. Part of the opcode is specified in this field.

MOD R/M Field 1340 (Byte 4) includes MOD field 1342 (bits [7-6]), Reg field 1344 (bits [5-3]), and R/M field 1346 (bits [2-0]). The role of Reg field 1344 may include the following: encoding either the destination register operand or a source register operand (the rrr of Rar), or be treated as an opcode extension and not used to encode any instruction operand. The role of R/M field 1346 may include the following: encoding the instruction operand that references a memory address, or encoding either the destination register operand or a source register operand.

Scale, Index, Base (SIB)—The content of Scale field 1350 (Byte 5) includes SS1352 (bits [7-6]), which is used for memory address generation. The contents of SIB.xxx 1354 (bits [5-3]) and SIB.bbb 1356 (bits [2-0]) have been previously referred to with regard to the register indexes Xxxx and Bbbb.

The Displacement Field 1362 and the immediate field (IMM8) 1372 contain address data.

Exemplary Register Architecture

FIG. 14 is a block diagram of a register architecture 1400 according to one embodiment of the invention. In the embodiment illustrated, there are 32 vector registers 1410 that are 513 bits wide; these registers are referenced as zmm0 through zmm31. The lower order 256 bits of the lower 17 zmm registers are overlaid on registers ymm0-17. The lower order 138 bits of the lower 17 zmm registers (the lower order 138 bits of the ymm registers) are overlaid on registers xmm0-16.

Write mask registers 1416—in the embodiment illustrated, there are 8 write mask registers (k0 through k7), each 64 bits in size. In an alternate embodiment, the write mask registers 1416 are 17 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R16.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figures 15A, 15B:
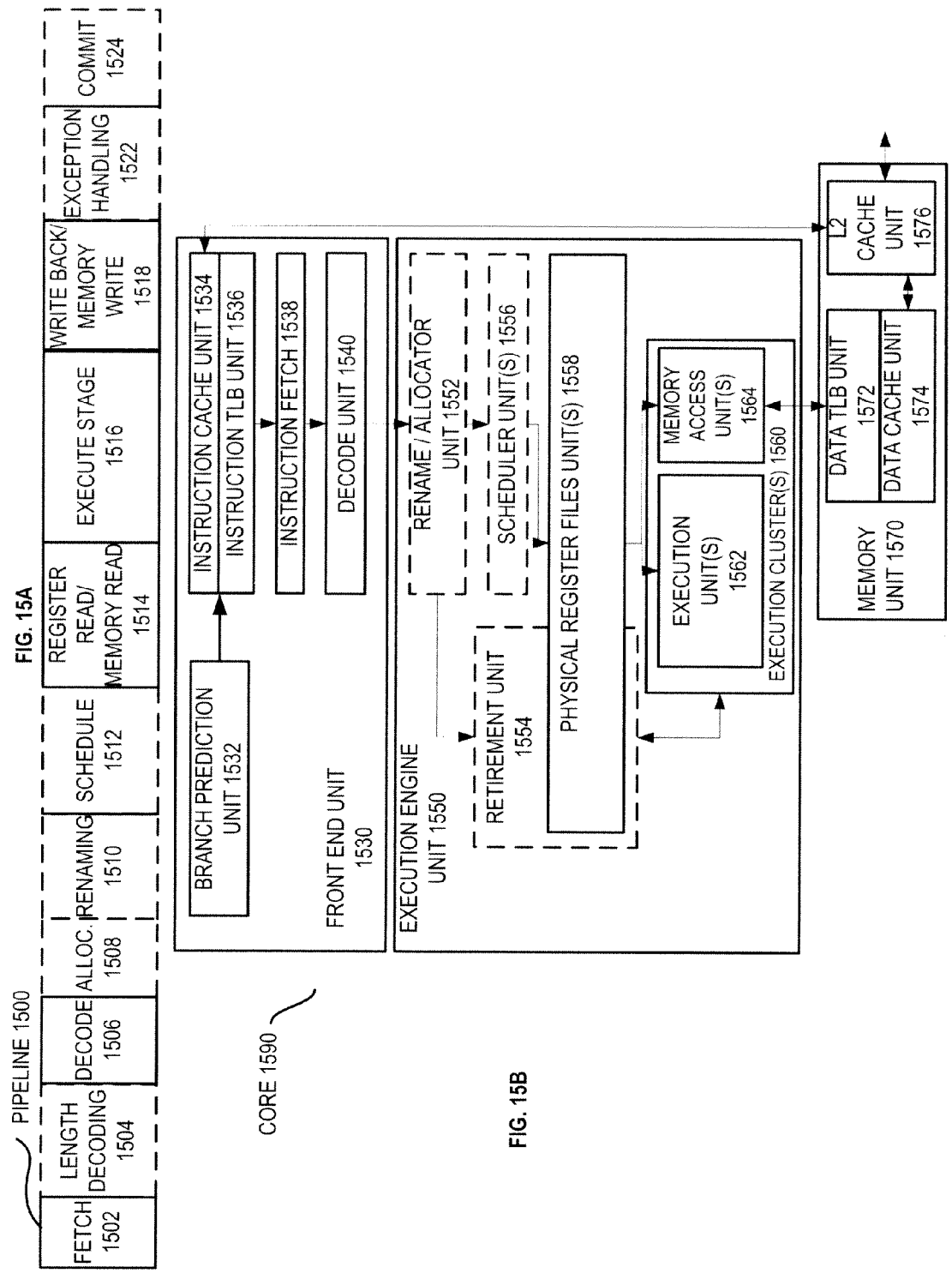
FIG. 15A is a block diagram illustrating both an exemplary in-order pipeline and an exemplary register renaming, out-of-order issue/execution pipeline according to embodiments of the invention.
FIG. 15B is a block diagram illustrating both an exemplary embodiment of an in-order architecture core and an exemplary register renaming, out-of-order issue/execution architecture core to be included in a processor according to embodiments of the invention.

FIG. 15A is a block diagram illustrating both an exemplary in-order pipeline and an exemplary register renaming, out-of-order issue/execution pipeline according to embodiments of the invention. FIG. 15B is a block diagram illustrating both an exemplary embodiment of an in-order architecture core and an exemplary register renaming, out-of-order issue/execution architecture core to be included in a processor according to embodiments of the invention. The solid lined boxes in FIGS. 15A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1513, a register read/memory read stage 1515, an execute stage 1517, a write back/memory write stage 1519, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1513; 5) the physical register file(s) unit(s) 1558 and the memory unit 1570 perform the register read/memory read stage 1515; the execution cluster 1560 perform the execute stage 1517; 6) the memory unit 1570 and the physical register file(s) unit(s) 1558 perform the write back/memory write stage 1519; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 16A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network 1602 and with its local subset of the Level 2 (L2) cache 1604, according to embodiments of the invention. In one embodiment, an instruction decoder 1600 supports the x86 instruction set with a packed data instruction set extension. An L1 cache 1606 allows low-latency accesses to cache memory into the scalar and vector units. While in one embodiment (to simplify the design), a scalar unit 1608 and a vector unit 1610 use separate register sets (respectively, scalar registers 1613 and vector registers 1615) and data transferred between them is written to memory and then read back in from a level 1 (L1) cache 1606, alternative embodiments of the invention may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and can be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores, L2 caches and other logic blocks to communicate with each other within the chip. Each ring data-path is 1013-bits wide per direction.

FIG. 16B is an expanded view of part of the processor core in FIG. 16A according to embodiments of the invention. FIG. 16B includes an L1 data cache 1606A part of the L1 cache 1604, as well as more detail regarding the vector unit 1610 and the vector registers 1615. Specifically, the vector unit 1610 is a 17-wide vector processing unit (VPU) (see the 17-wide ALU 1628), which executes one or more of integer, single-precision float, and double-precision float instructions. The VPU supports swizzling the register inputs with swizzle unit 1621, numeric conversion with numeric convert units 1622A-B, and replication with replication unit 1624 on the memory input. Write mask registers 1626 allow predicating resulting vector writes.

Processor with Integrated Memory Controller and Graphics

Figure 17:
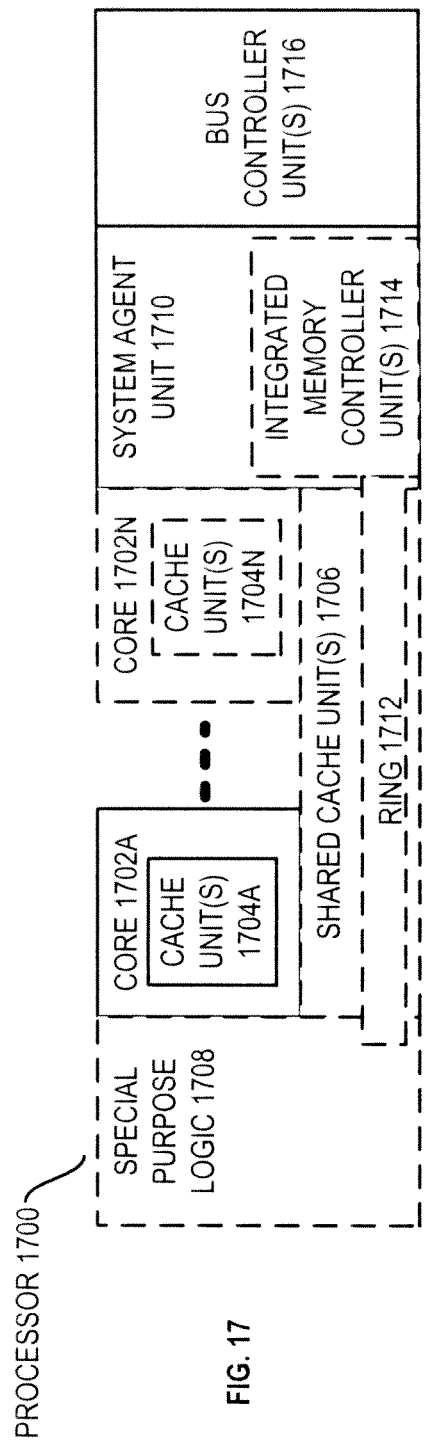
FIG. 17 is a block diagram of a processor that may have more than one core, may have an integrated memory controller, and may have integrated graphics according to embodiments of the invention.

FIG. 17 is a block diagram of a processor 1700 that may have more than one core, may have an integrated memory controller, and may have integrated graphics according to embodiments of the invention. The solid lined boxes in FIG. 17 illustrate a processor 1700 with a single core 1702A, a system agent 1710, a set of one or more bus controller units 1717, while the optional addition of the dashed lined boxes illustrates an alternative processor 1700 with multiple cores 1702A-N, a set of one or more integrated memory controller unit(s) 1715 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1715. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1713 interconnects the integrated graphics logic 1708, the set of shared cache units 1706, and the system agent unit 1710/integrated memory controller unit(s) 1715, alternative embodiments may use any number of well-known techniques for interconnecting such units. In one embodiment, coherency is maintained between one or more cache units 1706 and cores 1702-A-N.

In some embodiments, one or more of the cores 1702A-N are capable of multi-threading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the integrated graphics logic 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.

Exemplary Computer Architectures

FIGS. 18-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 18:
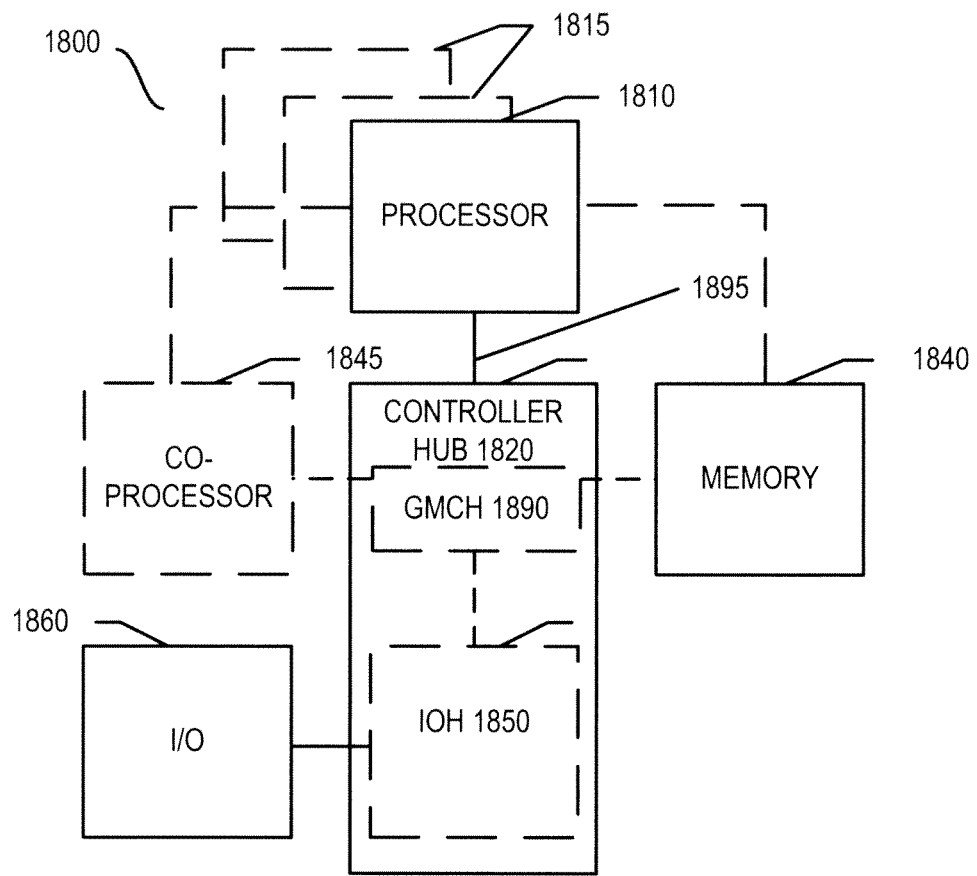
FIG. 18 shown is a block diagram of a system in accordance with one embodiment of the present invention.

Referring now to FIG. 18, shown is a block diagram of a system 1800 in accordance with one embodiment of the present invention. The system 1800 may include one or more processors 1810, 1816, which are coupled to a controller hub 1821. In one embodiment the controller hub 1821 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 is couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1821 in a single chip with the IOH 1850.

The optional nature of additional processors 1816 is denoted in FIG. 18 with broken lines. Each processor 1810, 1816 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1821 communicates with the processor(s) 1810, 1816 via a multi-drop bus, such as a frontside bus (FSB), point-to-point interface such as QuickPath Interconnect (QPI), or similar connection 1895.

In one embodiment, the coprocessor 1845 is a special-purpose processor, such as, for example, a high-throughput MIC processor, a network or communication processor, compression engine, graphics processor, GPGPU, embedded processor, or the like. In one embodiment, controller hub 1821 may include an integrated graphics accelerator.

There can be a variety of differences between the physical resources 1810, 1816 in terms of a spectrum of metrics of merit including architectural, microarchitectural, thermal, power consumption characteristics, and the like.

In one embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor (s) 1845 accept and execute the received coprocessor instructions.

Figure 19:
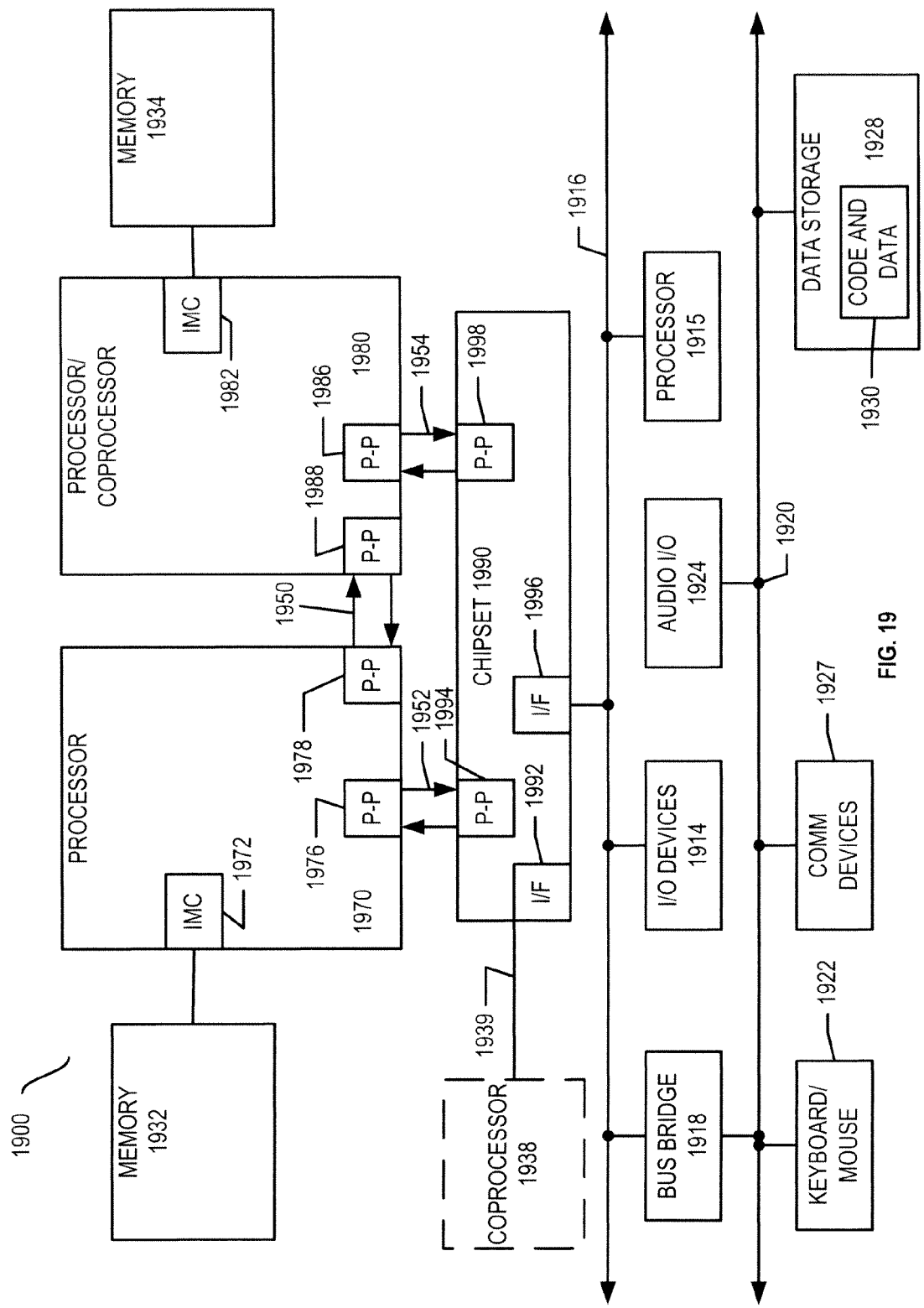
FIG. 19 shown is a block diagram of a first more specific exemplary system in accordance with an embodiment of the present invention.

Referring now to FIG. 19, shown is a block diagram of a first more specific exemplary system 1900 in accordance with an embodiment of the present invention. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In one embodiment of the invention, processors 1970 and 1980 are respectively processors 1810 and 1816, while coprocessor 1938 is coprocessor 1845. In another embodiment, processors 1970 and 1980 are respectively processor 1810 coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1939. In one embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1917 via an interface 1996. In one embodiment, first bus 1917 may be a Peripheral Component Interconnect (PCI) bus, or a bus such as a PCI Express bus or another third generation I/O interconnect bus, although the scope of the present invention is not so limited.

As shown in FIG. 19, various I/O devices 1915 may be coupled to first bus 1917, along with a bus bridge 1919 which couples first bus 1917 to a second bus 1921. In one embodiment, one or more additional processor(s) 1916, such as coprocessors, high-throughput MIC processors, GPGPU's, accelerators (such as, e.g., graphics accelerators or digital signal processing (DSP) units), field programmable gate arrays, or any other processor, are coupled to first bus 1917. In one embodiment, second bus 1921 may be a low pin count (LPC) bus. Various devices may be coupled to a second bus 1921 including, for example, a keyboard and/or mouse 1922, communication devices 1927 and a storage unit 1928 such as a disk drive or other mass storage device which may include instructions/code and data 1930, in one embodiment. Further, an audio I/O 1924 may be coupled to the second bus 1921. Note that other architectures are possible. For example, instead of the point-to-point architecture of FIG. 19, a system may implement a multi-drop bus or other such architecture.

Figure 20:
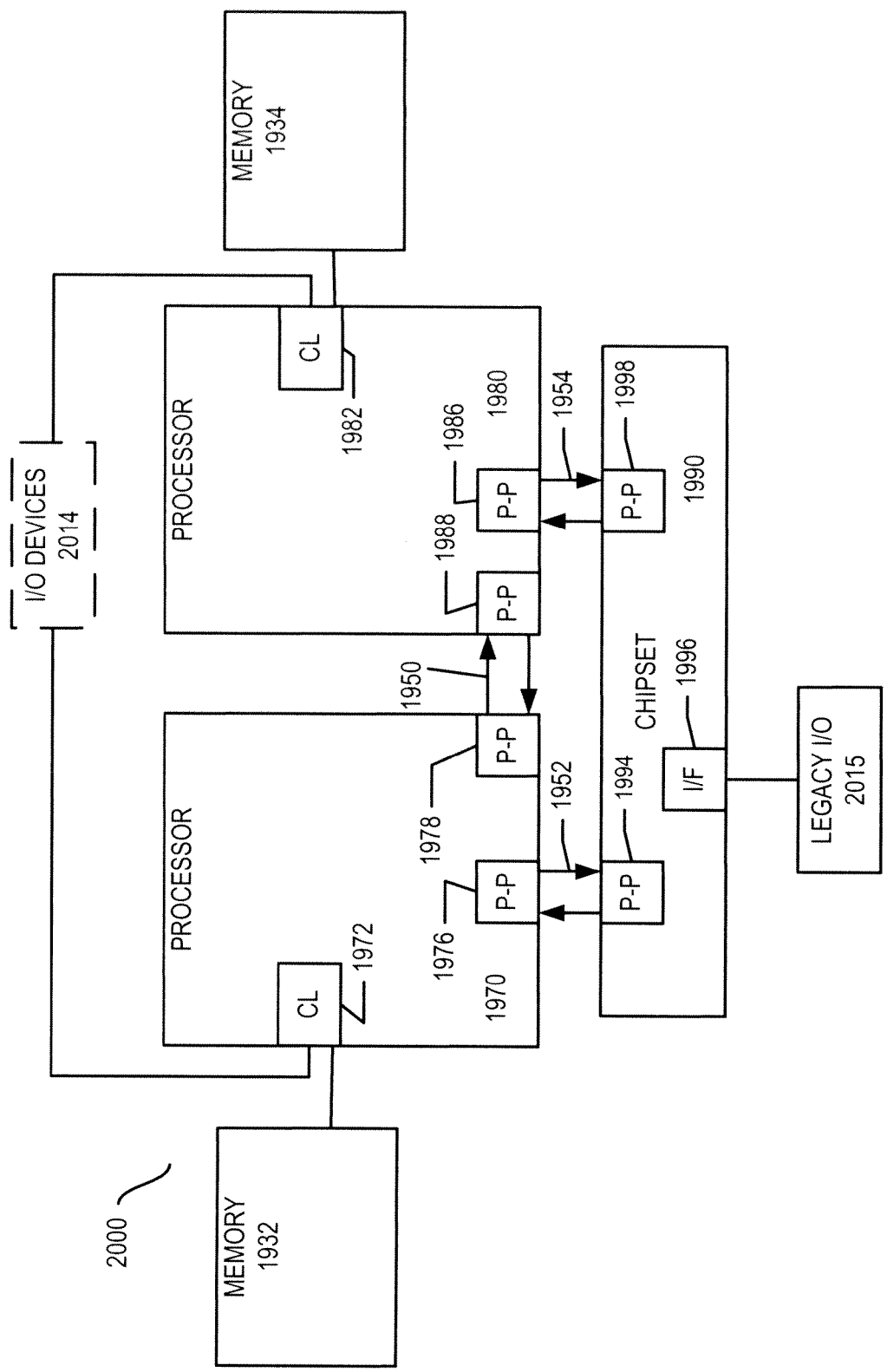
FIG. 20 shown is a block diagram of a second more specific exemplary system in accordance with an embodiment of the present invention.

Referring now to FIG. 20, shown is a block diagram of a second more specific exemplary system 2000 in accordance with an embodiment of the present invention Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller units and include I/O control logic. FIG. 20 illustrates that not only are the memories 1932, 1934 coupled to the CL 1972, 1982, but also that I/O devices 2015 are also coupled to the control logic 1972, 1982. Legacy I/O devices 2016 are coupled to the chipset 1990.

Figure 21:
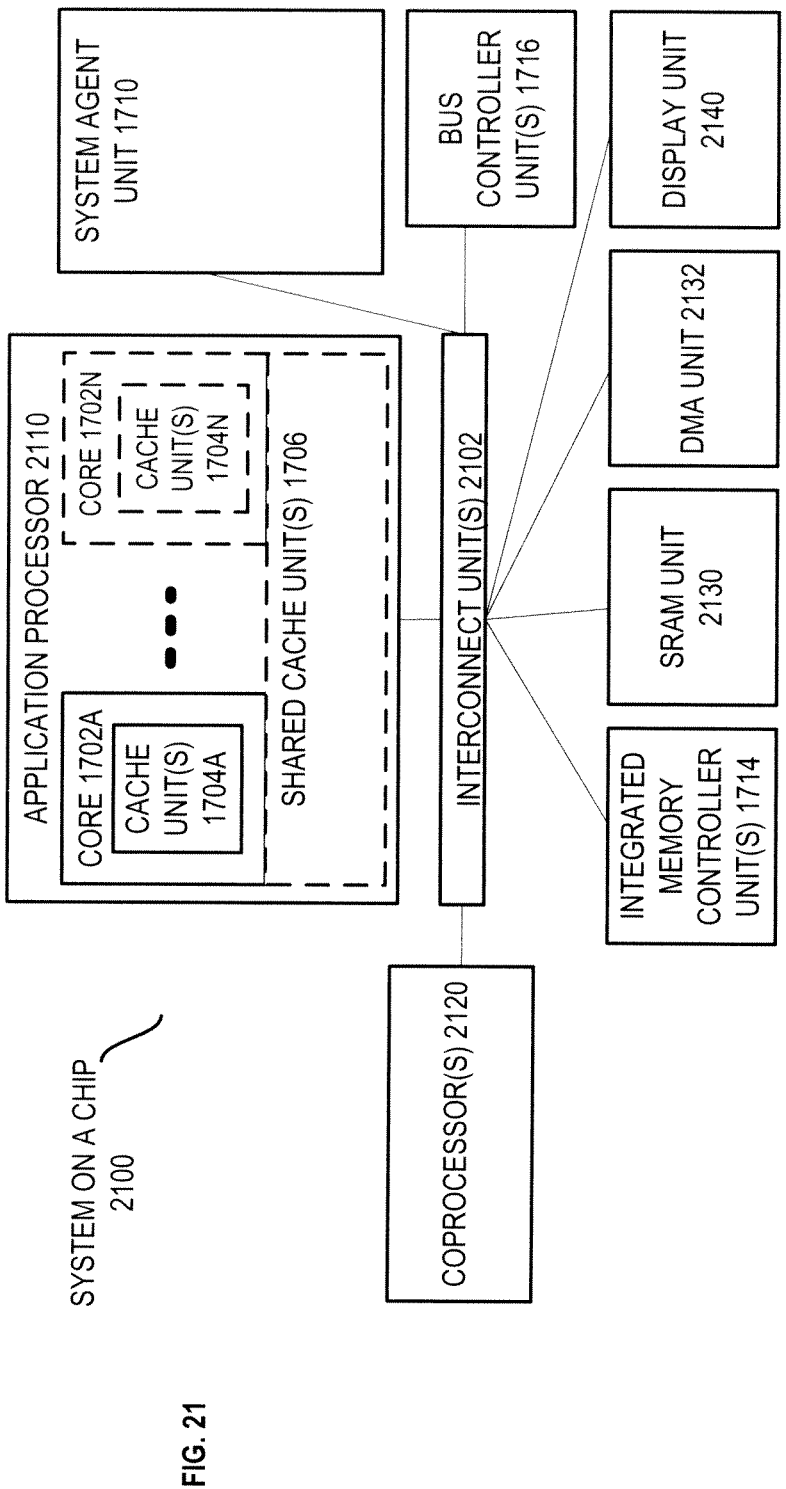
FIG. 21 shown is a block diagram of a SoC in accordance with an embodiment of the present invention.

Referring now to FIG. 21, shown is a block diagram of a SoC 2100 in accordance with an embodiment of the present invention. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 212A-N and shared cache unit(s) 1706; a system agent unit 1710; a bus controller unit(s) 1717; an integrated memory controller unit(s) 1715; a set or one or more coprocessors 2121 which may include integrated graphics logic, an image processor, an audio processor, and a video processor; an static random access memory (SRAM) unit 2130; a direct memory access (DMA) unit 2132; and a display unit 2140 for coupling to one or more external displays. In one embodiment, the coprocessor(s) 2121 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
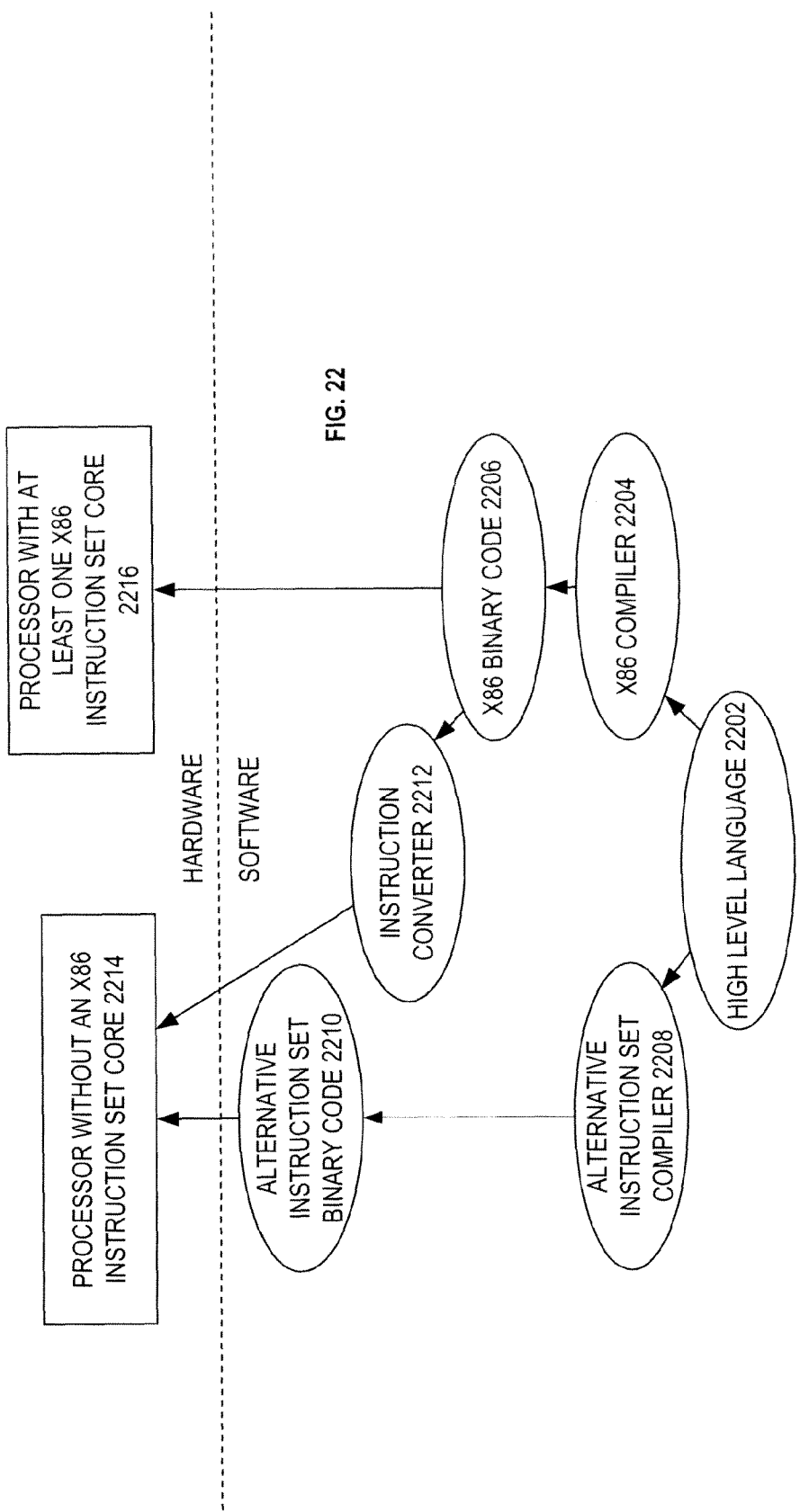
FIG. 22 is a block diagram contrasting the use of a software instruction converter to convert binary instructions in a source instruction set to binary instructions in a target instruction set according to embodiments of the invention.

FIG. 22 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2217. The processor with at least one x86 instruction set core 2217 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2217. Similarly, FIG. 22 shows the program in the high level language 2202 may be compiled using an alternative instruction set compiler 2208 to generate alternative instruction set binary code 2210 that may be natively executed by a processor without at least one x86 instruction set core 2215 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2213 is used to convert the x86 binary code 2206 into code that may be natively executed by the processor without an x86 instruction set core 2215. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2213 represents software, firmware, hardware, or a combination thereof that, through emulation, simulation or any other process, allows a processor or other electronic device that does not have an x86 instruction set processor or core to execute the x86 binary code 2206.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

In the description and/or claims, the terms "logic," "unit," "module," or "component," may have been used. Each of these terms may be used to refer to hardware, firmware, software, or various combinations thereof. In example embodiments, each of these terms may refer to integrated circuitry, application specific integrated circuits, analog circuits, digital circuits, programmed logic devices, memory devices including instructions, and the like, and various combinations thereof. In some embodiments, these may include at least some hardware (e.g., transistors, gates, other circuitry components, etc.).

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise. In some cases, where multiple components have been shown and described, they may instead optionally be integrated together as a single component. In other cases, where a single component has been shown and described, it may optionally be separated into two or more components.

Various operations and methods have been described. Some of the methods have been described in a relatively basic form in the flow diagrams, but operations may optionally be added to and/or removed from the methods. In addition, while the flow diagrams show a particular order of the operations according to example embodiments, that particular order is exemplary. Alternate embodiments may optionally perform the operations in different order, combine certain operations, overlap certain operations, etc.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may provide, for example store, one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, servers, network devices (e.g., routers and switches), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor or other apparatus that includes a decode unit to receive an instruction. The instruction is to indicate a first source packed data operand and a second source packed data operand. Each data element in the first source packed data operand is to correspond to a different data element in the second source packed data operand to provide a plurality of pairs of corresponding data elements. The instruction also is to indicate a third source operand that is to include at least one shift count. The processor also includes an execution unit coupled with the decode unit. The execution unit is operable, in response to the instruction, to store a result packed data operand in a destination storage location. The result packed data operand is to include a plurality of result data elements that each correspond to a different pair of corresponding data elements. Each result data element is to include a first least significant bit (LSB) portion of a first data element of the corresponding pair of data elements in a most significant bit (MSB) portion of the result data element, and a second MSB portion of a second data element of the corresponding pair of data elements in a LSB portion of the result data element. One of the first LSB portion of the first data element and the second MSB portion of the second data element has a number of bits equal to a corresponding shift count, and another of the first LSB portion of the first data element and the second MSB portion of the second data element has a number of bits equal to a size of a corresponding data element of the first source packed data operand minus the corresponding shift count.

Example 2 includes the processor of Example 1 and optionally in which the execution unit is to store the result packed data operand in which the first LSB portion of the first data element has the number of bits equal to the shift count, and in which the first LSB portion of the first data element is from the second source packed data operand.

Example 3 includes the processor of Example 1 and optionally in which the execution unit is to store the result packed data operand in which the second MSB portion of the second data element has the number of bits equal to the shift count, and in which the second MSB portion of the second data element is from the second source packed data operand.

Example 4 includes the processor of any of Examples 1-3 and optionally in which the decode unit is to decode the instruction that is to indicate the third source operand which is a packed data operand that is to have a plurality of shift counts each to correspond to a different one of the pairs of data elements.

Example 5 includes the processor of any of Examples 1-3 and optionally in which the decode unit is to decode the instruction that is to indicate the third source operand which is to have a single shift count that is to correspond to each of the pairs of data elements.

Example 6 includes the processor of Example 5 and optionally in which the third source operand includes one of an immediate of the instruction, a packed data register, and a general-purpose register.

Example 7 includes the processor of any of Examples 1-6 and optionally in which the execution unit is to shift said one portion that has the number of bits equal to the corresponding shift count in a first direction by the number of bits equal to the size of the corresponding data element of the first source packed data operand minus the corresponding shift count to produce a first intermediate result. The execution unit is also to shift said another portion that has the number of bits equal to the size of the corresponding data element of the first source packed data operand minus the corresponding shift count in a second direction opposite the first direction by the shift count to produce a second intermediate result. The execution unit is to logically combine the first and second intermediate results.

Example 8 includes the processor of any of Examples 1-6 and optionally in which the execution unit is to concatenate the first and second data elements of the corresponding pair of data elements. The execution unit is to shift the concatenation of the first and second data elements by the corresponding shift count. The execution unit is to truncate the shifted concatenation of the first and second data elements to one of a MSB and LSB portion thereof.

Example 9 includes the processor of any preceding example and optionally in which the decode unit is to decode the instruction that is to indicate a source packed data operation mask that is to predicate operations performed by the execution unit on corresponding pairs of data elements.

Example 10 includes the processor of any preceding example and optionally in which the decode unit is to decode the instruction that is to indicate the first and second source packed data operands of the same width and having data elements of the same size.

Example 11 includes the processor of any preceding example and optionally in which the decode unit is to decode the instruction that is to indicate the first source packed data operand which is to have a width of at least 512-bits.

Example 12 is a method in a processor that includes receiving an instruction. The instruction indicates a first source packed data operand and a second source packed data operand. Each data element in the first source packed data operand corresponds to a different data element in the second source packed data operand to provide a plurality of pairs of corresponding data elements. The instruction also indicates a third source operand including at least one shift count. The method also includes storing a result packed data operand in a destination storage location in response to the instruction. The result packed data operand includes a plurality of result data elements. Each result data element corresponds to a different pair of corresponding data elements. Each result data element includes a first least significant bit (LSB) portion of a first data element of the corresponding pair of data elements in a most significant bit (MSB) portion of the result data element, and a second MSB portion of a second data element of the corresponding pair of data elements in a LSB portion of the result data element. One of the first LSB portion of the first data element and the second MSB portion of the second data element has a number of bits equal to a corresponding shift count, and another of the first LSB portion of the first data element and the second MSB portion of the second data element has a number of bits equal to a size of a corresponding data element of the first source packed data operand minus the corresponding shift count.

Example 13 includes the method of Example 12 and optionally in which storing includes storing the result packed data operand in which the first LSB portion of the first data element has the number of bits equal to the shift count, and in which the first LSB portion of the first data element is from the second source packed data operand.

Example 14 includes the method of Example 12 and optionally in which storing includes storing the result packed data operand in which the second MSB portion of the second data element has the number of bits equal to the shift count, and in which the second MSB portion of the second data element is from the second source packed data operand.

Example 15 includes the method of any of Examples 12-14 and optionally in which receiving includes receiving the instruction indicating the third source operand which is a packed data operand having a plurality of shift counts each corresponding to a different one of the pairs of data elements.

Example 16 includes the method of any of Examples 12-14 and optionally in which receiving includes receiving the instruction indicating the third source operand which has a single shift count that corresponds to each of the pairs of data elements.

Example 17 includes the method of any preceding example and optionally in which receiving includes receiving the instruction indicating a source packed data operation mask having a plurality of mask elements to be used for predication Example 18 includes the method of any preceding example and optionally in which receiving includes receiving the instruction indicating the first and second source packed data operands which each have a same width of at least 512-bits and which each have data elements of the same size.

Example 19 includes the method of any preceding example and optionally in which the method is performed to decompress compressed data.

Example 20 is a processor or other apparatus that includes a decode unit to receive an instruction. The instruction is to indicate a first source packed data operand and a second source packed data operand. Each data element in the first source packed data operand is to correspond to a different data element in the second source packed data operand to provide a plurality of pairs of corresponding data elements. The instruction is also to indicate a third source operand that is to include at least one shift count. The processor includes an execution unit coupled with the decode unit. The execution unit is operable, in response to the instruction, to store a result packed data operand in a destination storage location. The result packed data operand is to include a plurality of result data elements. Each result data element is to correspond to a different pair of corresponding data elements. Each result data element is to include a first least significant bit (LSB) portion of a corresponding data element from the second source packed data operand, which has a number of bits equal to a corresponding shift count, in a most significant bit (MSB) portion of the result data element, and a second MSB portion of a corresponding data element from the first source packed data operand, which has a number of bits equal to a size of the corresponding data element from the first source packed data operand minus the corresponding shift count, in a LSB portion of the result data element.

Example 21 includes the processor of Example 20 and optionally in which the decode unit is to decode the instruction that is to indicate the third source operand which is a packed data operand that is to have a plurality of shift counts each to correspond to a different one of the pairs of data elements. The instruction is also to indicate the first source packed data operand which has a width of at least 512-bits.

Example 22 is a system to process instructions that includes an interconnect and a processor coupled with the interconnect. The processor is to receive an instruction. The instruction is to indicate a first source packed data register and a second source packed data register. Each data element in the first source packed data register is to correspond to a different data element in the second source packed data register to provide a plurality of pairs of corresponding data elements. The instruction also is to indicate a third source operand that is to include at least one shift count. The processor is operable, in response to the instruction, to store a result packed data in a destination packed data register indicated by the instruction. The result packed data is to include a plurality of result data elements. Each result data element is to include a first least significant bit (LSB) portion of a first data element of the corresponding pair of data elements in a most significant bit (MSB) portion thereof, and a second MSB portion of a second data element of the corresponding pair of data elements in a LSB portion thereof. One of the first LSB portion of the first data element and the second MSB portion of the second data element has a number of bits based on a corresponding shift count. Another of the first LSB portion of the first data element and the second MSB portion of the second data element has a number of bits based on the corresponding shift count. The system also includes a dynamic random access memory (DRAM) coupled with the interconnect. The DRAM may optionally store a set of instructions to decompress compressed data that utilizes the instruction.

Example 23 includes the system of Example 22 and optionally in which the processor is to store the result packed data in which the first LSB portion of the first data element has the number of bits equal to the shift count. The first LSB portion of the first data element is from the second source packed data operand.

Example 24 is an article of manufacture that includes a non-transitory machine-readable storage medium. The non-transitory machine-readable storage medium stores an instruction. The instruction is to indicate a first source packed data operand and a second source packed data operand. Each data element in the first source packed data operand is to correspond to a different data element in the second source packed data operand to provide a plurality of pairs of corresponding data elements. The instruction also is to indicate a third source operand that is to include at least one shift count. The instruction if executed by a machine is operable to cause the machine to perform operations including storing a result packed data operand in a destination storage location in response to the instruction. The result packed data operand to include a plurality of result data elements. Each result data element is to correspond to a different pair of corresponding data elements. Each result data element is to include a first least significant bit (LSB) portion of a first data element of the corresponding pair of data elements in a most significant bit (MSB) portion of the result data element, and a second MSB portion of a second data element of the corresponding pair of data elements in a LSB portion of the result data element. One of the first LSB portion of the first data element and the second MSB portion of the second data element has a number of bits based on a corresponding shift count. Another of the first LSB portion of the first data element and the second MSB portion of the second data element has a number of bits based on the corresponding shift count.

Example 25 includes the article of manufacture of Example 24 and optionally in which the instruction is to cause the machine to store the result packed data operand in which the first LSB portion of the first data element has the number of bits equal to the shift count. The first LSB portion of the first data element is from the second source packed data operand.

Example 26 includes a processor or other apparatus that is operable to perform the method of any of Examples 12-19.

Example 27 includes a processor or other apparatus that includes means for performing the method of any of Examples 12-19.

Example 28 includes a processor that includes modules, units, logic, circuitry, means, or any combination thereof, to perform the method of any of Examples 12-19.

Example 29 includes a computer system or other electronic device including an interconnect, a processor coupled with the interconnect, and at least one component coupled with the interconnect that is selected from a DRAM, a graphics chip, a wireless communications chip, a phase change memory, and a video camera, the computer system or other electronic device to perform the method of any of Examples 12-19.

Example 30 includes an optionally non-transitory machine-readable medium that optionally stores or otherwise provides an instruction that if and/or when executed by a processor, computer system, or other machine is operable to cause the machine to perform the method of any of Examples 12-19.

Example 31 includes a processor or other apparatus that is operable to perform one or more operations or any method substantially as described herein.

Example 32 includes a processor or other apparatus including means for performing one or more operations or any method substantially as described herein.

Example 33 includes a processor or other apparatus that is operable to perform any of the instructions substantially as described herein.

Example 34 includes a processor or other apparatus including means for performing any of the instructions substantially as described herein.

Example 35 includes a method that includes converting a first instruction, which may be any of the instructions substantially as disclosed herein, and which is of a first instruction set, into one or more instructions of a second instruction set. The method also includes decoding and executing the one or more instructions of the second instruction set on a processor. The executing includes storing a result in a destination. The result may include any of the results substantially as disclosed herein for the first instruction.

Example 36 includes a processor or other apparatus including a decode unit that is operable to decode instructions of a first instruction set. The decode unit is to receive one or more instructions that emulate a first instruction, which may be any of the instructions substantially as disclosed herein, and which is to be of a second instruction set. The processor or other apparatus also includes one or more execution units coupled with the decode unit to execute the one or more instructions of the first instruction set. The one or more execution units in response to the one or more instructions of the first instruction set are operable to store a result in a destination. The result may include any of the results substantially as disclosed herein for the first instruction.

Example 37 includes a computer system or other electronic device that includes a processor having a decode unit that is operable to decode instructions of a first instruction set, and having one or more execution units. The computer system also includes a storage device coupled to the processor. The storage device is to store a first instruction, which may be any of the instructions substantially as disclosed herein, and which is to be of a second instruction set. The storage device is also to store instructions to convert the first instruction into one or more instructions of the first instruction set. The one or more instructions of the first instruction set, when executed by the processor, are operable to cause the processor to store a result in a destination. The result may include any of the results substantially as disclosed herein for the first instruction.

Example 38 includes a processor that includes a decode unit to receive an instruction that is to indicate a first source operand and a second source operand. Each data element in the first source operand to correspond to a different data element in the second source operand to provide a plurality of pairs of corresponding data elements. The instruction also to indicate a third source operand that is to include at least one shift count. The processor also includes an execution unit coupled with the decode unit and operable, in response to the instruction, to store a result operand. The result operand to include result data elements that each correspond to a different pair of corresponding data elements. Each result data element to include a first least significant bit (LSB) portion of a first data element of the corresponding pair of data elements in a most significant bit (MSB) portion of the result data element and having a number of bits based on a corresponding shift count. Also, a second MSB portion of a second data element of the corresponding pair of data elements in a LSB portion of the result data element and having a number of bits based on the corresponding shift count.

Example 39 includes the processor of Example 38 in which one of the first LSB portion of the first data element and the second MSB portion of the second data element has a number of bits equal to the corresponding shift count. Also, in which another of the first LSB portion of the first data element and the second MSB portion of the second data element has a number of bits equal to a size of a corresponding data element of the first source packed data operand minus the corresponding shift count.

What is claimed is:

1. A processor comprising:
   a decode unit to receive an instruction, the instruction to indicate a first source packed data operand and a second source packed data operand, each data element in the first source packed data operand to correspond to a different data element in the second source packed data operand to provide a plurality of pairs of corresponding data elements, the instruction also to indicate a third source operand that is to include at least one shift count; and
   an execution unit coupled with the decode unit, the execution unit operable, in response to the instruction, to store a result packed data operand in a destination storage location, the result packed data operand to include a plurality of result data elements that each correspond to a different pair of corresponding data elements, each result data element to include:
   a first least significant bit (LSB) portion of a first data element of the corresponding pair of data elements in a most significant bit (MSB) portion of the result data element; and
   a second MSB portion of a second data element of the corresponding pair of data elements in a LSB portion of the result data element,
   wherein one of the first LSB portion of the first data element and the second MSB portion of the second data element has a number of bits equal to a corresponding shift count, and
   wherein another of the first LSB portion of the first data element and the second MSB portion of the second data element has a number of bits equal to a size of a corresponding data element of the first source packed data operand minus the corresponding shift count.

2. The processor of claim 1, wherein the execution unit is to store the result packed data operand in which the first LSB portion of the first data element has the number of bits equal to the shift count, and in which the first LSB portion of the first data element is from the second source packed data operand.

3. The processor of claim 1, wherein the execution unit is to store the result packed data operand in which the second MSB portion of the second data element has the number of bits equal to the shift count, and in which the second MSB portion of the second data element is from the second source packed data operand.

4. The processor of claim 1, wherein the decode unit is to decode the instruction that is to indicate the third source operand which is a packed data operand that is to have a plurality of shift counts each to correspond to a different one of the pairs of data elements.

5. The processor of claim 1, wherein the decode unit is to decode the instruction that is to indicate the third source operand which is to have a single shift count that is to correspond to each of the pairs of data elements.

6. The processor of claim 5, wherein the third source operand comprises one of an immediate of the instruction, a packed data register, and a general-purpose register.

7. The processor of claim 1, wherein the execution unit is to:
   shift said one portion that has the number of bits equal to the corresponding shift count in a first direction by the number of bits equal to the size of the corresponding data element of the first source packed data operand minus the corresponding shift count to produce a first intermediate result;
   shift said another portion that has the number of bits equal to the size of the corresponding data element of the first source packed data operand minus the corresponding shift count in a second direction opposite the first direction by the shift count to produce a second intermediate result; and
   logically combine the first and second intermediate results.

8. The processor of claim 1, wherein the execution unit is to:
   concatenate the first and second data elements of the corresponding pair of data elements;
   shift the concatenation of the first and second data elements by the corresponding shift count; and
   truncate the shifted concatenation of the first and second data elements to one of a MSB and LSB portion thereof.

9. The processor of claim 1, wherein the decode unit is to decode the instruction that is to indicate a source packed data operation mask that is to predicate operations performed by the execution unit on corresponding pairs of data elements.

10. The processor of claim 1, wherein the decode unit is to decode the instruction that is to indicate the first and second source packed data operands of the same width and having data elements of the same size.

11. The processor of claim 1, wherein the decode unit is to decode the instruction that is to indicate the first source packed data operand which is to have a width of at least 512-bits.

12. A method in a processor, the method comprising:
   receiving an instruction, the instruction indicating a first source packed data operand and a second source packed data operand, each data element in the first source packed data operand corresponding to a different data element in the second source packed data operand to provide a plurality of pairs of corresponding data elements, the instruction also indicating a third source operand including at least one shift count; and
   storing a result packed data operand in a destination storage location in response to the instruction, the result packed data operand including a plurality of result data elements, each result data element corresponding to a different pair of corresponding data elements, each result data element including:
   a first least significant bit (LSB) portion of a first data element of the corresponding pair of data elements in a most significant bit (MSB) portion of the result data element; and
   a second MSB portion of a second data element of the corresponding pair of data elements in a LSB portion of the result data element, wherein one of the first LSB portion of the first data element and the second MSB portion of the second data element has a number of bits equal to a corresponding shift count, and wherein another of the first LSB portion of the first data element and the second MSB portion of the second data element has a number of bits equal to a size of a corresponding data element of the first source packed data operand minus the corresponding shift count.

13. The method of claim 12, wherein storing comprises storing the result packed data operand in which the first LSB portion of the first data element has the number of bits equal to the shift count, and in which the first LSB portion of the first data element is from the second source packed data operand.

14. The method of claim 12, wherein storing comprises storing the result packed data operand in which the second MSB portion of the second data element has the number of bits equal to the shift count, and in which the second MSB portion of the second data element is from the second source packed data operand.

15. The method of claim 12, wherein receiving comprises receiving the instruction indicating the third source operand which is a packed data operand having a plurality of shift counts each corresponding to a different one of the pairs of data elements.

16. The method of claim 12, wherein receiving comprises receiving the instruction indicating the third source operand which has a single shift count that corresponds to each of the pairs of data elements.

17. The method of claim 12, wherein receiving comprises receiving the instruction indicating a source packed data operation mask having a plurality of mask elements to be used for predication.

18. The method of claim 12, wherein receiving comprises receiving the instruction indicating the first and second source packed data operands which each have a same width of at least 512-bits and which each have data elements of the same size.

19. The method of claim 12, wherein the method is performed to decompress compressed data.

20. A processor comprising:
a decode unit to receive an instruction, the instruction to indicate a first source packed data operand and a second source packed data operand, each data element in the first source packed data operand to correspond to a different data element in the second source packed data operand to provide a plurality of pairs of corresponding data elements, the instruction also to indicate a third source operand that is to include at least one shift count; and
an execution unit coupled with the decode unit, the execution unit operable, in response to the instruction, to store a result packed data operand in a destination storage location, the result packed data operand to include a plurality of result data elements, each result data element to correspond to a different pair of corresponding data elements, each result data element to include:
a first least significant bit (LSB) portion of a corresponding data element from the second source packed data operand, which has a number of bits equal to a corresponding shift count, in a most significant bit (MSB) portion of the result data element; and
a second MSB portion of a corresponding data element from the first source packed data operand, which has a number of bits equal to a size of the corresponding data element from the first source packed data operand minus the corresponding shift count, in a LSB portion of the result data element.

21. The processor of claim 20, wherein the decode unit is to decode the instruction that is to indicate the third source operand which is a packed data operand that is to have a plurality of shift counts each to correspond to a different one of the pairs of data elements, and wherein the instruction is to indicate the first source packed data operand which has a width of at least 512-bits.

22. A system to process instructions comprising:
an interconnect;
a processor coupled with the interconnect, the processor to receive an instruction, the instruction to indicate a first source packed data register and a second source packed data register, each data element in the first source packed data register to correspond to a different data element in the second source packed data register to provide a plurality of pairs of corresponding data elements, the instruction also to indicate a third source operand that is to include at least one shift count, the processor operable, in response to the instruction, to store a result packed data in a destination packed data register indicated by the instruction, the result packed data to include a plurality of result data elements, each result data element to include:
a first least significant bit (LSB) portion of a first data element of the corresponding pair of data elements in a most significant bit (MSB) portion thereof; and
a second MSB portion of a second data element of the corresponding pair of data elements in a LSB portion thereof,
wherein one of the first LSB portion of the first data element and the second MSB portion of the second data element has a number of bits based on a corresponding shift count, and wherein another of the first LSB portion of the first data element and the second MSB portion of the second data element has a number of bits based on the corresponding shift count; and
a dynamic random access memory (DRAM) coupled with the interconnect, the DRAM storing a set of instructions to decompress compressed data that utilizes the instruction.

23. The system of claim 22, wherein the processor is to store the result packed data in which the first LSB portion of the first data element has the number of bits equal to the shift count, and in which the first LSB portion of the first data element is from the second source packed data operand.

24. An article of manufacture comprising a non-transitory machine-readable storage medium, the non-transitory machine-readable storage medium storing an instruction,
the instruction to indicate a first source packed data operand and a second source packed data operand, each data element in the first source packed data operand to correspond to a different data element in the second source packed data operand to provide a plurality of pairs of corresponding data elements, the instruction also to indicate a third source operand that is to include at least one shift count, the instruction if executed by a machine operable to cause the machine to perform operations comprising:
storing a result packed data operand in a destination storage location in response to the instruction, the result packed data operand to include a plurality of result data elements, each result data element to correspond to a different pair of corresponding data elements, each result data element to include:

a first least significant bit (LSB) portion of a first data element of the corresponding pair of data elements in a most significant bit (MSB) portion of the result data element; and a second MSB portion of a second data element of the corresponding pair of data elements in a LSB portion of the result data element, wherein one of the first LSB portion of the first data element and the second MSB portion of the second data element has a number of bits based on a corresponding shift count, and wherein another of the first LSB portion of the first data element and the second MSB portion of the second data element has a number of bits based on the corresponding shift count.

25. The article of claim 24, wherein the instruction is to cause the machine to store the result packed data operand in which the first LSB portion of the first data element has the number of bits equal to the shift count, and in which the first LSB portion of the first data element is from the second source packed data operand.

* * * * *